United States Patent
Fan et al.

(10) Patent No.: US 12,128,306 B2
(45) Date of Patent: Oct. 29, 2024

(54) INFORMATION DISPLAY METHOD AND APPARATUS, TERMINAL, AND STORAGE MEDIUM

(71) Applicant: Tencent Technology (Shenzhen) Company Limited, Shenzhen (CN)

(72) Inventors: Chenda Fan, Shenzhen (CN); Shenyang Hu, Shenzhen (CN); Wanna Jin, Shenzhen (CN); Yinhao Liu, Shenzhen (CN); Wen Yang, Shenzhen (CN); Xudong Jiang, Shenzhen (CN); Yuchen Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 243 days.

(21) Appl. No.: 17/745,771

(22) Filed: May 16, 2022

(65) Prior Publication Data

US 2022/0379211 A1    Dec. 1, 2022

Related U.S. Application Data

(63) Continuation of application No. PCT/CN2021/126736, filed on Oct. 27, 2021.

(30) Foreign Application Priority Data

Jun. 1, 2021    (CN) .................. 202110609808.X

(51) Int. Cl.
*A63F 13/537*    (2014.01)
*A63F 13/2145*    (2014.01)
*A63F 13/795*    (2014.01)

(52) U.S. Cl.
CPC ........ *A63F 13/537* (2014.09); *A63F 13/2145* (2014.09); *A63F 13/795* (2014.09)

(58) Field of Classification Search
None
See application file for complete search history.

(56) References Cited

U.S. PATENT DOCUMENTS

| | | | | |
|---|---|---|---|---|
| 7,445,549 | B1 * | 11/2008 | Best .................. | A63F 13/12 463/31 |
| 2015/0335999 | A1 | 11/2015 | Shimizu et al. | |
| 2019/0366221 | A1 | 12/2019 | Suzuki et al. | |

FOREIGN PATENT DOCUMENTS

| | | |
|---|---|---|
| CN | 106919790 A | 7/2017 |
| CN | 107694089 A | 2/2018 |

(Continued)

OTHER PUBLICATIONS

Honor of Kings from Wikipedia, May 14, 2021, Wayback machine, https://web.archive.org/web/20210514150114/https://en.wikipedia.org/wiki/Honor_of_Kings (Year: 2021).*

(Continued)

*Primary Examiner* — Damon J Pierce
(74) *Attorney, Agent, or Firm* — Morgan, Lewis & Bockius LLP

(57) ABSTRACT

An information display method includes: displaying, on the electronic device of a user account, a first display region and a second display region of a target battle; receiving information associated with a selection of a target virtual object; and in accordance with a determination that the target virtual object matches at least one second-type virtual object, displaying first prompt information associated with the target virtual object in the first display region, and displaying second prompt information associated with the target virtual object in the second display region.

20 Claims, 7 Drawing Sheets

(56) References Cited

FOREIGN PATENT DOCUMENTS

| | | | |
|---|---|---|---|
| CN | 111147891 A | 5/2020 |
| CN | 112044059 A | 12/2020 |
| CN | 112619145 A | 4/2021 |
| CN | 112619167 A | 4/2021 |
| CN | 112691377 A | 4/2021 |
| CN | 112717421 A | 4/2021 |
| CN | 113181647 A | 7/2021 |
| JP | 2004222989 A | 8/2004 |
| JP | 2010162176 A | 7/2010 |
| JP | 2018020231 A | 2/2018 |
| JP | 2019042020 A | 3/2019 |
| JP | 2020140404 A | 9/2020 |
| KR | 10-1665040 B1 | 10/2016 |
| TW | 201142690 A | 12/2011 |

OTHER PUBLICATIONS

Tencent Technology, ISR, PCT/CN2021/126736, Feb. 28, 2022, 3 pgs.

Nocturnal, "Honor of Kings S15 Season Call-up Mode BP Process", nmgfic.com, Apr. 16, 2019, 8 pgs., Retrieved from the Internet: https://m.nmgfic.com/gonglue/722.html.

Tencent Technology, Japanese Office Action, JP Patent Application No. 2022-559321, Sep. 12, 2023, 9 pgs.

Tencent Technology, WO, PCT/CN2021/126736, Feb. 28, 2022, 6 pgs.

Tencent Technology, IPRP, PCT/CN2021/126736, Nov. 21, 2023, 7 pgs.

"Analysis of the New Rules of BP in the S15 Season of King of Glory", May 9, 2019, 4 pgs., Retrieved from the Internet: https://m.jisuxz.com/article/26617.html.

"King of Glory S15 Season Call-up Mode BP Process", Apr. 16, 2019, 8 pgs., Retrieved from the Internet: https:/m.nmgfic.com/gonglue/722.html.

Tencent Technology, Korean Office Action, KR Patent Application No. 10-2022-7032199, Jul. 8, 2024, 9 pgs.

\* cited by examiner

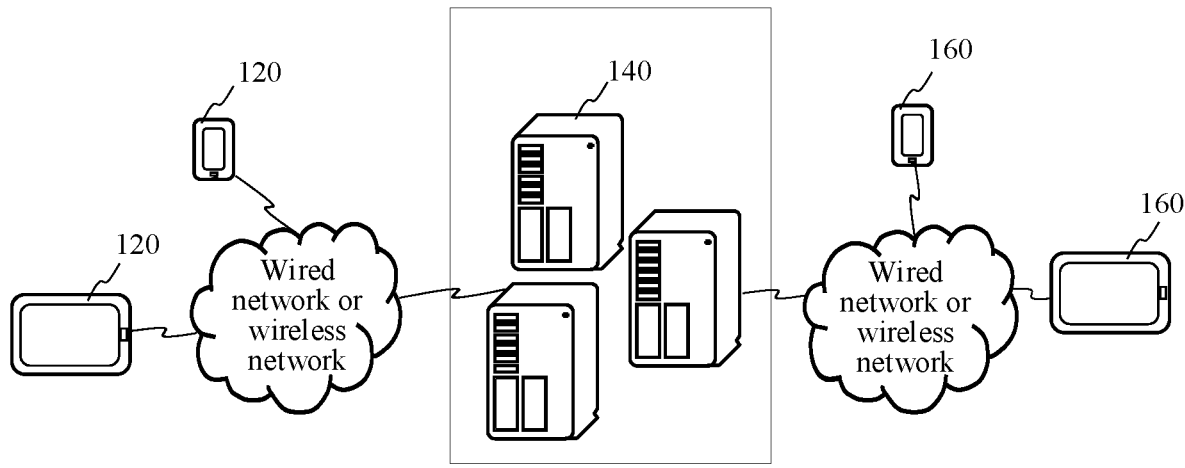

FIG. 1

```
┌─────────────────────────────────────────────────────────────┐
│ A terminal displays a first display region and a second     │── 201
│ display region of a target battle, the first display region │
│ being configured to display a plurality of to-be-banned     │
│ first-type virtual objects, and the second display region   │
│ being configured to display at least one second-type        │
│ virtual object associated with at least one friendly account│
└─────────────────────────────────────────────────────────────┘
                              │
                              ▼
┌─────────────────────────────────────────────────────────────┐
│ The terminal determines a selected target virtual object in │── 202
│ response to a selection operation for the plurality of      │
│ first-type virtual objects                                  │
└─────────────────────────────────────────────────────────────┘
                              │
                              ▼
┌─────────────────────────────────────────────────────────────┐
│ In accordance with a determination that the target virtual  │── 203
│ object matches the at least one second-type virtual object, │
│ the terminal displays first prompt information at a         │
│ position of the target virtual object in the first display  │
│ region, and displays second prompt information at a position│
│ of the target virtual object in the second display region   │
└─────────────────────────────────────────────────────────────┘
```

FIG. 2

INFORMATION DISPLAY METHOD AND APPARATUS, TERMINAL, AND STORAGE MEDIUM

CROSS-REFERENCE TO RELATED APPLICATIONS

This application is a continuation application of PCT Patent Application No. PCT/CN2021/126736, entitled "INFORMATION DISPLAY METHOD, DEVICE, TERMINAL AND STORAGE MEDIUM" filed on Oct. 27, 2021, which claims priority to Chinese Patent Application No. 202110609808.X, filed with the State Intellectual Property Office of the People's Republic of China on Jun. 1, 2021, and entitled "INFORMATION DISPLAY METHOD AND APPARATUS, TERMINAL, AND STORAGE MEDIUM", all of which are incorporated herein by reference in their entirety.

FIELD OF THE TECHNOLOGY

This application relates to the field of computer technologies, and in particular, to an information display method and apparatus, a terminal, and a storage medium.

BACKGROUND OF THE DISCLOSURE

With the development of terminal technologies, an increasing number of game programs can be run on terminals, and multiplayer online battle arena (MOBA) games are one type of those games. At a preparation stage of the MOBA game, users belonging to two opposing camps need to sequentially select virtual objects used in a current game from a plurality of virtual objects.

SUMMARY

Embodiments of this application provide an information display method and apparatus, a terminal, and a storage medium, which can effectively prompt a user of the presence of a friendly account associated with a target virtual object, to prevent the user from mistakenly banning a virtual object that the friendly account intends to use and causing disbanding of a battle, thereby saving time of the user, and improving man-machine interaction efficiency. The technical solutions are as follows:

According to an aspect, an information display method is provided, including:
 displaying, on the electronic device of a user account, a first display region and a second display region of a target battle, the first display region configured to display a plurality of to-be-banned first-type virtual objects, the second display region configured to display at least one second-type virtual object associated with at least one friendly account, wherein the friendly account is an account from a same camp as the user account in the target battle;
 receiving information associated with a selection of a target virtual object from the plurality of first-type virtual objects; and
 in accordance with a determination that the target virtual object matches the at least one second-type virtual object:
 displaying first prompt information associated with the target virtual object in the first display region, wherein the first prompt information indicates a presence of a friendly account associated with the target virtual object; and
 displaying second prompt information associated with the target virtual object in the second display region, wherein
 the second prompt information indicates a corresponding position of the target virtual object in the second display region.

According to another aspect, an information display apparatus is provided, including:
 a display module, configured to display a first display region and a second display region of a target battle, the first display region being configured to display a plurality of to-be-banned first-type virtual objects, the second display region being configured to display at least one second-type virtual object associated with at least one friendly account, the friendly account being an account belonging to a same camp as a user account in the target battle, the user account being an account logged in by the terminal; and
 a determining module, configured to determine a selected target virtual object in response to a selection operation for the plurality of first-type virtual objects,
 the display module being further configured to: in a case that the target virtual object matches the at least one second-type virtual object, display first prompt information associated with the target virtual object in the first display region, and display second prompt information associated with the target virtual object in the second display region,
 the first prompt information being used for indicating a presence of a friendly account associated with the target virtual object, and the second prompt information being used for prompting a corresponding position of the target virtual object in the second display region.

In some embodiments, the display module is further configured to: in accordance with a determination that the target virtual object matches the at least one second-type virtual object, display a first floating window at a corresponding position of the target virtual object in the first display region, display the first prompt information in the first floating window, and display the second prompt information in a special effect form at the corresponding position of the target virtual object in the second display region.

In some embodiments, the display module is further configured to: in accordance with a determination that the target virtual object matches the at least one second-type virtual object, display a first floating window at a corresponding position of the target virtual object in the first display region, display the first prompt information in the first floating window, display a second floating window at the corresponding position of the target virtual object in the second display region, and display the second prompt information in the second floating window.

In some embodiments, the display module is further configured to: in accordance with a determination that the target virtual object matches the at least one second-type virtual object, display the first prompt information in a special effect form at a corresponding position of the target virtual object in the first display region, display a second floating window at the corresponding position of the target virtual object in the second display region, and display the second prompt information in the second floating window.

In some embodiments, the display module is further configured to: in accordance with a determination that the target virtual object matches the at least one second-type virtual object, display the first prompt information in a special effect form at a corresponding position of the target virtual object in the first display region, and display the second prompt information in a special effect form at the corresponding position of the target virtual object in the second display region.

In some embodiments, the second display region is further configured to display at least one third-type virtual object preselected by a friendly account in the target battle; and the display module is further configured to: in accordance with a determination that the target virtual object matches the at least one third-type virtual object, display third prompt information based on the target virtual object in the first display region, and display fourth prompt information based on the target virtual object in the second display region, the third prompt information being used for indicating a presence of a friendly account that preselects the target virtual object, and the fourth prompt information being used for prompting the corresponding position of the target virtual object in the second display region.

In some embodiments, the display module is further configured to: in accordance with a determination that the target virtual object matches the at least one third-type virtual object, display a third floating window at a corresponding position of the target virtual object in the first display region, display the third prompt information in the third floating window, and display the fourth prompt information in a special effect form at the corresponding position of the target virtual object in the second display region.

In some embodiments, the display module is further configured to: in accordance with a determination that the target virtual object matches the at least one third-type virtual object, display a third floating window at a corresponding position of the target virtual object in the first display region, display the third prompt information in the third floating window, display a fourth floating window at the corresponding position of the target virtual object in the second display region, and display the fourth prompt information in the fourth floating window.

In some embodiments, the display module is further configured to: in accordance with a determination that the target virtual object matches the at least one third-type virtual object, display the third prompt information in a special effect form at a corresponding position of the target virtual object in the first display region, display a fourth floating window at the corresponding position of the target virtual object in the second display region, and display the fourth prompt information in the fourth floating window.

In some embodiments, the display module is further configured to: in accordance with a determination that the target virtual object matches the at least one third-type virtual object, display the third prompt information in a special effect form at a corresponding position of the target virtual object in the first display region, and display the fourth prompt information in a special effect form at the corresponding position of the target virtual object in the second display region.

In some embodiments, the display module is further configured to remove the third prompt information in accordance with a determination that a display duration of the third prompt information exceeds a first duration.

In some embodiments, the display module is further configured to remove the fourth prompt information in accordance with a determination that a display duration of the fourth prompt information exceeds a second duration.

In some embodiments, the apparatus further includes:
a first playback module, configured to play a first prompt sound effect in accordance with a determination that the target virtual object matches the at least one third-type virtual object, the first prompt sound effect being used for prompting that the target virtual object matches the at least one third-type virtual object.

In some embodiments, display forms of the plurality of first-type virtual objects and the at least one second-type virtual object include an avatar form and a card form.

In some embodiments, the apparatus further includes:
a first obtaining module, configured to: obtain at least one friendly account in the target battle; and obtain at least one virtual object associated with the at least one friendly account as the at least one second-type virtual object.

In some embodiments, the apparatus further includes:
a second obtaining module, configured to determine a virtual object associated with one of the at least one friendly account according to virtual objects used by the friendly account in a plurality of historical battles, the historical battle being a battle before the target battle.

In some embodiments, the display module is further configured to remove the first prompt information in accordance with a determination that a display duration of the first prompt information exceeds a third duration.

In some embodiments, the display module is further configured to remove the second prompt information in accordance with a determination that a display duration of the second prompt information exceeds a fourth duration.

In some embodiments, the apparatus further includes:
a second playback module, configured to play a second prompt sound effect in accordance with a determination that the target virtual object matches the at least one second-type virtual object, the second prompt sound effect being used for prompting that the target virtual object matches the at least one second-type virtual object.

According to another aspect, a terminal is provided, including a processor and a memory, the memory being configured to store at least one computer program, the at least one computer program being loaded and executed by the processor to implement the following steps:

displaying a first display region and a second display region of a target battle, the first display region being configured to display a plurality of to-be-banned first-type virtual objects, the second display region being configured to display at least one second-type virtual object associated with at least one friendly account, the friendly account being an account belonging to a same camp as a user account in the target battle, the user account being an account logged in by the terminal;

determining a selected target virtual object in response to a selection operation for the plurality of first-type virtual objects; and in accordance with a determination that the target virtual object matches the at least one second-type virtual object, displaying first prompt information based on the target virtual object in the first display region, and displaying second prompt information based on the target virtual object in the second display region, the first prompt information being used for indicating a presence of a friendly account associated with the target virtual object, and the second prompt information being used for prompting a corresponding position of the target virtual object in the second display region.

According to another aspect, a computer-readable storage medium is provided, storing at least one computer program, the at least one computer program being loaded and executed by a processor to implement the following steps:

displaying a first display region and a second display region of a target battle, the first display region being configured to display a plurality of to-be-banned first-type virtual objects, the second display region being configured to display at least one second-type virtual object associated with at least one friendly account, the friendly account being an account belonging to a same camp as a user account in the target battle, the user account being an account logged in by the terminal;

determining a selected target virtual object in response to a selection operation for the plurality of first-type virtual objects; and in accordance with a determination that the target virtual object matches the at least one second-type virtual object, displaying first prompt information based on the target virtual object in the first display region, and displaying second prompt information based on the target virtual object in the second display region, the first prompt information being used for indicating a presence of a friendly account associated with the target virtual object, and the second prompt information being used for prompting a corresponding position of the target virtual object in the second display region.

According to another aspect, a computer program product or a computer program is provided, including computer program code, the computer program code being stored in a computer-readable storage medium. A processor of a terminal reads the computer program code from the computer-readable storage medium, and the processor executes the computer program code, to cause the terminal to perform the following steps:

displaying a first display region and a second display region of a target battle, the first display region being configured to display a plurality of to-be-banned first-type virtual objects, the second display region being configured to display at least one second-type virtual object associated with at least one friendly account, the friendly account being an account belonging to a same camp as a user account in the target battle, the user account being an account logged in by the terminal;

determining a selected target virtual object in response to a selection operation for the plurality of first-type virtual objects; and in accordance with a determination that the target virtual object matches the at least one second-type virtual object, displaying first prompt information based on the target virtual object in the first display region, and displaying second prompt information based on the target virtual object in the second display region, the first prompt information being used for indicating a presence of a friendly account associated with the target virtual object, and the second prompt information being used for prompting a corresponding position of the target virtual object in the second display region.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

FIG. 1 is a schematic diagram of an implementation environment of an information display method according to an embodiment of this application.

FIG. 2 is a flowchart of an information display method according to an embodiment of this application.

DESCRIPTION OF EMBODIMENTS

Figure 3:
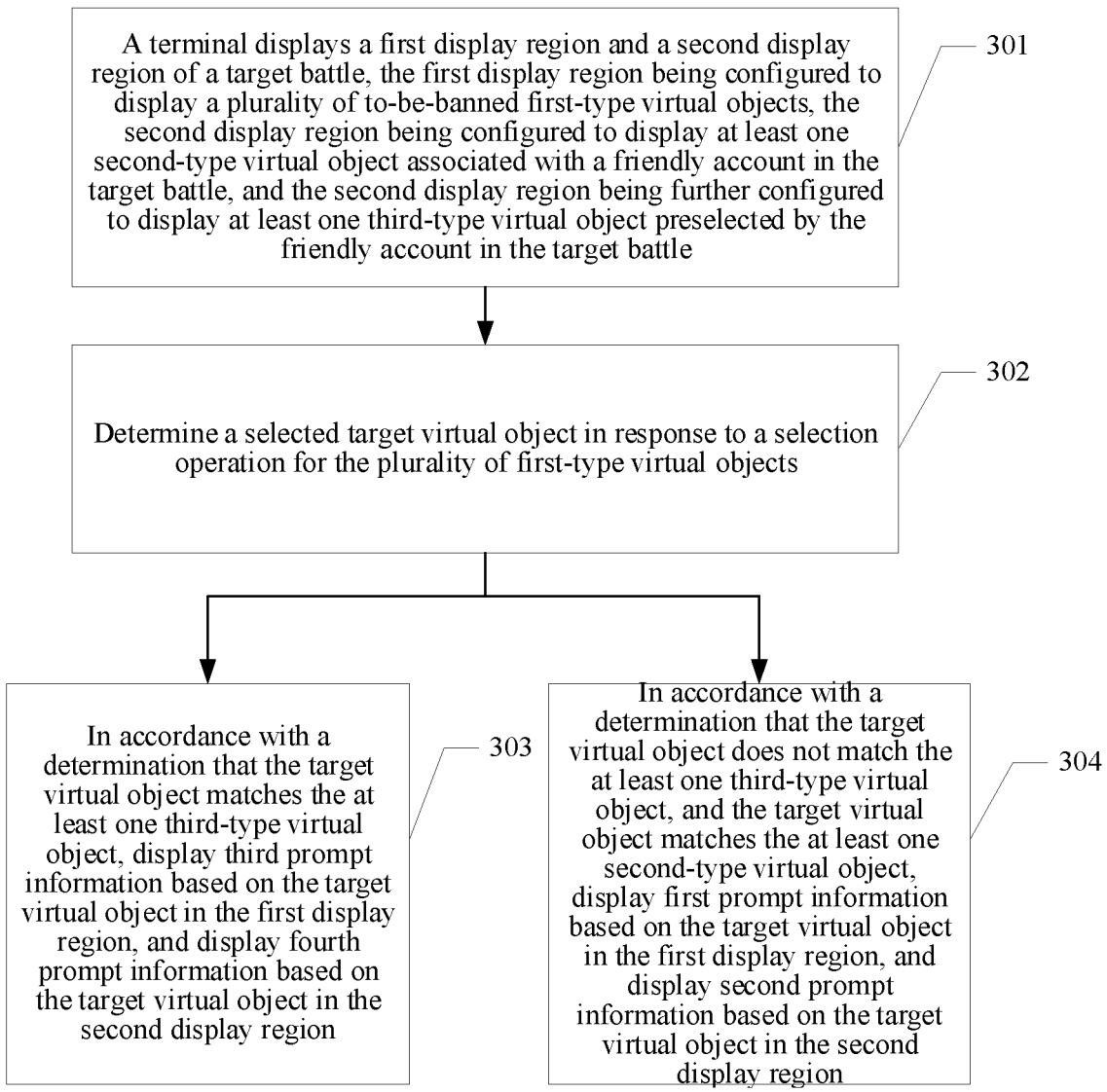
FIG. 3 is another flowchart of an information display method according to an embodiment of this application.

To make objectives, technical solutions, and advantages of this application clearer, the following further describes implementations of this application in detail with reference to the accompanying drawings.

The terms "first", "second", and the like in this application are used for distinguishing between same items or similar items of which effects and functions are basically the same. The "first", "second", and "nth" do not have a dependency relationship in logic or time sequence, and a quantity and an execution order thereof are not limited.

In this application, the term "at least one" means one or more and the term "a plurality of" means two or more.

Terms involved in this application are explained below.

Virtual scene: It is a virtual scene displayed (or provided) when an application is run on a terminal. The virtual scene may be a simulated environment of a real world, or may be a semi-simulated semi-fictional virtual environment, or may be an entirely fictional virtual environment. The virtual scene may be any one of a two-dimensional virtual scene, a 2.5-dimensional virtual scene, or a three-dimensional virtual scene, and the dimension of the virtual scene is not limited in the embodiments of this application. For example, the virtual scene may include the sky, the land, the ocean, or the like. The land may include environmental elements such as the desert and a city. The user may control the virtual object to move in the virtual scene.

Virtual object: It is a movable object in a virtual world. The movable object may be at least one of a virtual person, a virtual animal, and a cartoon person. In some embodiments, when a virtual world is a three-dimensional virtual world, the virtual objects are three-dimensional models. Each virtual object has a shape and a volume in the three-dimensional virtual world, and occupies some space in the three-dimensional virtual world. In some embodiments, the virtual object is a three-dimensional character constructed based on three-dimensional human skeleton technology. The virtual object wears different skins to implement different appearances. In some embodiments, the virtual object is implemented by using a 2.5-dimensional model or a two-dimensional model. This is not limited in the embodiments of this application. In a MOBA game, the virtual object is referred to as a hero.

MOBA game: It is a game in which several forts are provided in a virtual world, and users on different camps control virtual objects to battle in the virtual world, occupy forts or destroy forts of the opposing camp. For example, in the MOBA game, the users may be divided into two opposing camps. The virtual objects controlled by the terminal users are scattered in the virtual world to compete with each other, and the victory condition is to destroy or occupy all enemy forts. The victory conditions include, but not limited to, at least one of: occupying forts or destroy forts of the opposing camps, killing virtual objects in the opposing camps, ensure own survivals in a specified scenario and time, seizing a specific resource, and outscoring the opponent within a specified time. The MOBA game takes place in rounds. A duration of one round of the MOBA game is from a moment at which the game starts to a moment at which the victory condition is met. Each camp includes one or more virtual objects, for example, 1 virtual object, 2 virtual objects, 3 virtual objects, or 5 virtual objects.

Ban Pick (BP) stage: It means that in the MOBA game, users ban virtual objects and select virtual objects at the preparation stage before the start of the current round of game. Banned virtual objects are forbidden to be picked by all users in the current round of game.

Intend-to-play hero: It means that in the MOBA game, a user may select one or more heroes that the user intends to play in advance, and intend-to-play heroes of users are displayed at the BP stage.

Preselected hero: It means that at the BP stage in the MOBA game, a user having not had his turn to pick a hero may select a hero in advance as a hero expected to use, and show the hero to a friendly account.

At present, before users select virtual objects used in the current round of game sequentially, the users also need to select virtual objects banned in the current round of game, that is, to select virtual objects that cannot be used by any user in the current round of game. Because when a user selects a virtual object banned in the current round of game, the user may mistakenly ban a virtual object that a friendly account intends to use, the friendly account cannot select the virtual object that he intends to use, which cause disbanding of a battle, and consequently wasting time of the user, resulting in low man-machine interaction efficiency.

The following describes an implementation environment related to this application.

The information display method provided in the embodiments of this application can be performed by a terminal. The following describes an implementation environment of the information display method provided in the embodiments of this application. FIG. 1 is a schematic diagram of an implementation environment of an information display method according to an embodiment of this application. Referring to FIG. 1, the implementation environment includes: a first terminal 120, a server 140, and a second terminal 160.

The first terminal 120 and the second terminal 160 are communicatively connected to the server 140 directly or indirectly by using a wireless network or a wired network.

The first terminal 120 is a smartphone, a tablet computer, a notebook computer, a desktop computer, a smart speaker, a smartwatch, or the like, but is not limited thereto. An application supporting a virtual scene is installed and run on the first terminal 120. The application may be any one of a first-person shooting game (FPS) game, a third-person shooting game, a MOBA game, a virtual reality application, a three-dimensional map program, a military simulation program, or a multiplayer gunfight survival game. In some embodiments, the first terminal 120 is a terminal used by a user, and the user can use the first terminal 120 to operate a virtual object in the virtual scene to perform a movement. The movement includes, but not limited to, at least one of body posture adjustment, crawling, walking, running, cycling, jumping, driving, picking-up, shooting, attacking, and throwing. In some embodiments, the virtual object is a virtual character, such as a simulated character role or a cartoon character role.

In some embodiments, the server 140 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The server 140 is configured to provide a backend service for an application supporting a virtual scene. In some embodiments, the server 140 takes on primary computing work, and the first terminal 120 takes on secondary computing work; alternatively, the server 140 takes on secondary computing work, and the first terminal 120 takes on primary computing work; alternatively, collaborative computing is performed by using a distributed computing architecture between the server 140 and the first terminal 120.

The applications installed on the second terminal 160 and the first terminal 120 are the same, or the applications installed on the two terminals are the same type of applications on different operating system platforms.

In some embodiments, the first terminal 120 generally refers to one of a plurality of terminals, the second terminal 160 generally refers to one of a plurality of terminals, and this embodiment is described by using the first terminal 120 and the second terminal 160 as an example. A person skilled in the art may learn that there may be more or fewer terminals. The quantity and the device type of the terminals are not limited in the embodiments of this application.

FIG. 2 is a flowchart of an information display method according to an embodiment of this application. As shown in FIG. 2, an example of executing by the terminal is used for description in this embodiment of this application. The information display method includes the following steps:

201: A terminal displays a first display region and a second display region of a target battle, the first display region being configured to display a plurality of to-be-banned first-type virtual objects, and the second display region being configured to display at least one second-type virtual object associated with at least one friendly account.

In this embodiment of this application, the target battle is a current game battle. The first display region and the second display region are object display regions corresponding to a preparation stage of the game battle, for example, hero display regions corresponding to a BP stage in a MOBA game. The plurality of first-type virtual objects are to-be-banned virtual objects, that is, a selected first-type virtual object will be prohibited from being used in the game battle. The at least one second-type virtual object is at least one virtual object associated with at least one friendly account, for example, a hero that a friendly account intends to use or a hero that the friendly account is good at using in a MOBA game. The at least one friendly account in the target battle is an account belonging to the same camp as a user account in the target battle, the user account being an account logged in by the terminal.

202: The terminal determines a selected target virtual object in response to a selection operation for the plurality of first-type virtual objects.

In this embodiment of this application, in response to detecting a selection operation for the plurality of first-type virtual objects, the terminal determines a selected first-type virtual object as the target virtual object. In other words, the target virtual object is a virtual object to be banned, for example, a hero to be banned in a MOBA game.

203: In accordance with a determination that the target virtual object matches the at least one second-type virtual object, the terminal displays first prompt information at a position of the target virtual object in the first display region, and displays second prompt information at a position of the target virtual object in the second display region.

In this embodiment of this application, after determining the target virtual object, the terminal can detect whether the target virtual object matches the at least one second-type virtual object, that is, detect whether the selected first-type virtual object matches the at least one second-type virtual object. After determining that the target virtual object matches the at least one second-type virtual object, the terminal can respectively display the first prompt information and the second prompt information in the first display region and the second display region, the first prompt information being used for indicating a presence of a friendly account associated with the target virtual object, and the second prompt information being used for prompting a corresponding position of the target virtual object in the second display region.

According to the solution provided in this embodiment of this application, by determining whether a friendly account is associated with a selected target virtual object when a user selects a first-type virtual object, and then when the friendly account is associated with the target virtual object, performing prompting for the target virtual object in a first display region and a second display region respectively, which can effectively prompt the user of existence of the friendly account associated with the target virtual object, to prevent the user from mistakenly banning a virtual object that the friendly account intends to use and causing disbanding of a battle, thereby saving time of the user, and improving man-machine interaction efficiency.

FIG. 2 exemplarily shows a process of an information display method according to an embodiment of this application. The following further describes the information display method based on an application scenario. FIG. 3 is another flowchart of an information display method according to an embodiment of this application. As shown in FIG. 3, an example of executing by the terminal is used for description in this embodiment of this application. The information display method includes the following steps:

301: A terminal displays a first display region and a second display region of a target battle, the first display region being configured to display a plurality of to-be-banned first-type virtual objects, the second display region being configured to display at least one second-type virtual object associated with a friendly account in the target battle, and the second display region being further configured to display at least one third-type virtual object preselected by the friendly account in the target battle.

In this embodiment of this application, an application supporting a virtual scene, for example, a MOBA game program, is run on the terminal. The target battle is a current game battle. The first display region is a region for displaying a plurality of first-type virtual objects at a preparation stage of the game battle, for example, a hero display region corresponding to a BP stage in a MOBA game. The second display region is a region for displaying at least one second-type virtual object and at least one third-type virtual object at the preparation stage of the game battle, for example, a friendly account display region corresponding to a BP stage in a MOBA game. The friendly account is an account belonging to the same camp as a user account in the target battle, the user account being an account logged in by the terminal. At the BP stage, the user can select a hero for banning from the hero display region, and the banned hero cannot be used in the target battle. That is, no account can use the hero in the target battle.

The plurality of first-type virtual objects are to-be-banned virtual objects, for example, to-be-banned heroes in a MOBA game. The at least one second-type virtual object is at least one virtual object associated with at least one friendly account, for example, a hero that a friendly account intends to use or a hero that the friendly account is good at using in a MOBA game. The at least one third-type virtual object is a virtual object preselected by the friendly account, for example, a hero preselected by the friendly account during waiting for hero selection in a MOBA game. The preselected virtual object is a virtual object that is undetermined after being selected. The friendly account belongs to the same camp as the user account in the target battle, the user account being an account currently logged in by the terminal.

For example, a MOBA game includes a BP stage and a hero selection stage. At the BP stage, the user account is responsible for selecting banned heroes. After the BP stage ends and the hero selection stage starts, the friendly account and the user account can respectively select heroes used in the target battle from unbanned heroes and perform determination. At the BP stage, the friendly account can also preselect a hero, that is, can select the hero but cannot perform determination. The terminal displays the hero preselected by the friendly account. If the hero preselected by the friendly account is not banned, at the hero selection stage, the friendly account no longer needs to perform selection, and may perform determination directly, so as to quickly select an intend-to-play hero, and other friendly accounts and the user account can no longer select the hero. If the hero preselected by the friendly account is banned, the terminal cancels the display of the hero preselected by the friendly account, and the friendly account may preselect a hero again, or select a hero again after the BP stage.

In this embodiment of this application, an example in which three-dimensional models of virtual objects are displayed in the first display region and the second display region are used for description. In some embodiments, the terminal displays virtual objects in a card form in the first display region and the second display region, or the terminal displays avatars of the virtual objects in the first display region and the second display region.

In some embodiments, when the terminal displays the virtual objects in the card form in the first display region and the second display region, the first display region is configured to display object cards of a plurality of to-be-banned first-type virtual objects, the second display region is configured to display at least one object card of at least one second-type virtual object associated with a friendly account in the target battle, and the second display region is further configured to display at least one object card of at least one third-type virtual object preselected by the friendly account in the target battle. Because the virtual objects in the card form can occupy a relatively small quantity of display resources, by displaying the virtual objects in the card form, the resource occupancy rate of the terminal can be reduced, and the efficiency of displaying the virtual objects by the terminal can be improved.

In some embodiments, when the terminal displays the avatars of the virtual objects in the first display region and the second display region, the first display region is configured to display avatars of a plurality of to-be-banned first-type virtual objects, the second display region is configured to display at least one avatar of at least one second-type virtual object associated with a friendly account in the target battle, and the second display region is further configured to display at least one avatar of at least one third-type virtual object preselected by the friendly account in the target battle. Because the virtual objects in the avatar form can occupy a relatively small quantity of display resources, and a plurality of virtual objects can be simultaneously displayed due to a relatively small size of the virtual objects in the avatar form, not only the resource occupancy rate of the terminal can be reduced, but also the quantity of virtual objects displayed by the terminal can be increased, thereby improving the efficiency of displaying virtual objects by the terminal.

Figure 4:
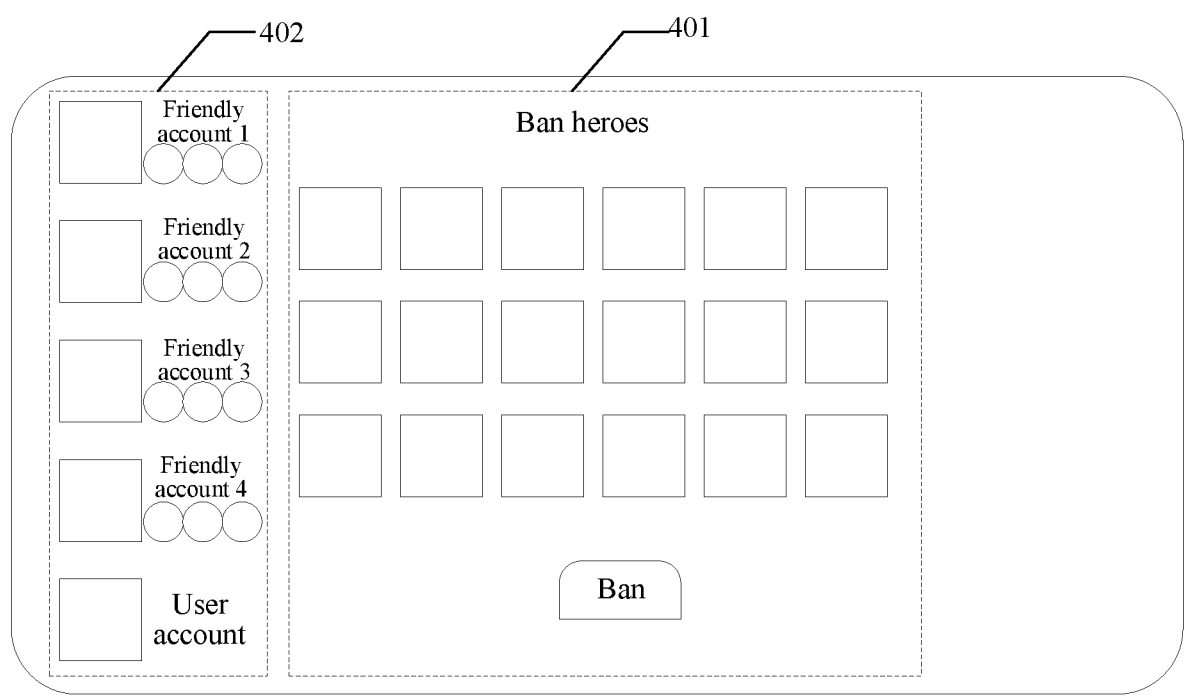
FIG. 4 is a schematic diagram of an interface of a target battle according to an embodiment of this application.

For example, a BP stage in a MOBA game is used as an example. FIG. 4 is a schematic diagram of an interface of a target battle according to an embodiment of this application. As shown in FIG. 4, the target battle includes a first display region 401 and a second display region 402. The second display region 402 displays a user account and four friendly accounts: a friendly account 1, a friendly account 2, a friendly account 3, and a friendly account 4. Virtual objects in the MOBA game are heroes, and each friendly account is associated with at most 3 heroes. Certainly, the friendly accounts may alternatively not be associated with heroes. An example in which each friendly account is associated with three heroes and preselects one hero is used. Circles in the second display region 402 represent avatars of the three heroes associated with the friendly account, and boxes represent an avatar of the one hero preselected by the friendly account. The first display region 401 displays avatars of a plurality of to-be-banned heroes and a banning button. The banning button is configured to instruct the terminal to ban a selected hero after being triggered.

In some embodiments, before displaying the first display region and the second display region of the target battle, the terminal obtains at least one friendly account in the target battle, and then obtains at least one virtual object associated with the at least one friendly account as the at least one second-type virtual object. In some embodiments, the terminal can determine a virtual object associated with an account based on historical battles corresponding to the account. The terminal can determine a virtual object associated with the friendly account according to virtual objects used by the friendly account in a plurality of historical battles, the historical battle being a battle before the target battle. By determining the virtual object associated with the friendly account based on the virtual objects used by the friendly account in the historical battles, the determined virtual object is a virtual object that the friendly account intends to use, or the determined virtual object is a virtual object that the friendly account is good at using, or the determined virtual object is a virtual object recently used by the friendly account.

In some embodiments, the terminal determines the virtual object associated with the friendly account according to a quantity of times that the friendly account has used each virtual object in the plurality of historical battles. The terminal can determine the quantity of times that the friendly account has used each virtual object in the plurality of historical battles, and then determine a virtual object with the largest quantity of times of use as the virtual object associated with the friendly account, or determine at least one virtual object with a quantity of times of use whose rank is not less than a target order as the virtual object associated with the friendly account, so that the determined virtual object is the virtual object most commonly used by the friendly account.

This embodiment of this application is described by using an example in which the terminal determines the virtual object associated with the friendly account based on the historical battles corresponding to the account. In some embodiments, a server determines the virtual object associated with the friendly account based on the historical battles corresponding to the account, and the terminal obtains the virtual object associated with the friendly account from the server.

Certainly, the terminal can further provide an associated account setting page, the associated account setting page being configured to set at least one virtual object associated with the account. A friendly account is used as an example. The terminal logged in with the friendly account determines at least one virtual object associated with the friendly account according to a setting operation of the friendly account on the associated account setting page, and sends the at least one virtual object associated with the friendly account to the server. A terminal logged in with a user account can obtain at least one virtual object associated with the friendly account from the server. By providing the associated account setting page, the friendly account can set the virtual object that the friendly account intends to use or is good at using as the virtual object associated with the friendly account.

In this embodiment of this application, the at least one second-type virtual object associated with the friendly account displayed in the second display region includes at least one of the following: a virtual object determined based on virtual objects used by the friendly account in a plurality of historical battles; and a virtual object determined based on a setting operation of the friendly account on the associated account setting page.

302: Determine a selected target virtual object in response to a selection operation for the plurality of first-type virtual objects.

In this embodiment of this application, in response to detecting a selection operation for the plurality of first-type virtual objects, the terminal determines a selected first-type virtual object as the target virtual object.

In accordance with a determination that the terminal detects a banning operation after determining the target virtual object, the target virtual object is banned; and in accordance with a determination that the terminal detects a selection operation on another first-type virtual object again after determining the target virtual object, the terminal determines the another selected virtual object as a new target virtual object, that is, the target virtual object can be replaced at any time before the user triggers the banning operation.

The plurality of first-type virtual objects are virtual objects that can be banned by the user; the at least one second-type virtual object is a virtual object associated with the friendly account, that is, the at least one second-type virtual object is a virtual object that the friendly account intends to play or is good at playing; and the at least one third-type virtual object is a virtual object preselected by the friendly account, that is, the at least one third-type virtual object is a virtual object to be used by the friendly account in the target battle. Therefore, to prevent the user from banning the virtual object that the friendly account intends to play or to use, after the terminal determines the target virtual object, the terminal respectively compare the target virtual object with the at least one second-type virtual object and the at least one third-type virtual object.

In some embodiments, after determining the target virtual object, the terminal obtains a target object identifier of the target virtual object, and then determines, according to the target object identifier, whether the target virtual object matches the at least one second-type virtual object or matches the at least one third-type virtual object. The terminal obtains the target object identifier of the target virtual object. Subsequently, in accordance with a determination that the target object identifier is the same as an object identifier of any third-type virtual object, the terminal determines that the target virtual object matches the at least one third-type virtual object. In accordance with a determination that the target virtual object does not exist in the at least one third-type virtual object, and the target object identifier is the same as an object identifier of any second-type virtual object, the terminal determines that the target virtual object matches the at least one second-type virtual object.

303: In accordance with a determination that the target virtual object matches the at least one third-type virtual object, display third prompt information based on the target virtual object in the first display region, and display fourth prompt information based on the target virtual object in the second display region.

In this embodiment of this application, after determining the target virtual object, the terminal detects whether the target virtual object matches the at least one third-type virtual object, that is, detect whether the selected first-type virtual object matches the at least one third-type virtual object. After determining that the target virtual object matches the at least one third-type virtual object, the terminal respectively display the third prompt information and the fourth prompt information in the first display region and the second display region. The third prompt information is used for indicating a presence of a friendly account that preselects the target virtual object, and the fourth prompt information is used for prompting the corresponding position of the target virtual object in the second display region. The terminal can display the third prompt information and the fourth prompt information in different forms, such as a floating window form and a special effect form. This is not limited in this embodiment of this application. By displaying the third prompt information and the fourth prompt information, the efficiency of obtaining prompt information by the user can be improved, thereby improving man-machine interaction efficiency.

In some embodiments, the terminal displays the third prompt information in a floating window form, and displays the fourth prompt information in a special effect form. In accordance with a determination that the target virtual object matches the at least one third-type virtual object, the terminal displays a third floating window at a corresponding position of the target virtual object in the first display region, displays the third prompt information in the third floating window, and the terminal displays the fourth prompt information in a special effect form at the corresponding position of the target virtual object in the second display region. The third prompt information and the fourth prompt information are simultaneously displayed. By displaying the third prompt information in the floating window, the user can clearly obtain the third prompt information, so as to know that the target virtual object has been preselected by the friendly account, and not be attracted by other virtual objects as the background to ignore the third prompt information, which improves the efficiency of obtaining the third prompt information by the user, thereby improving the man-machine interaction efficiency. By displaying the fourth prompt information in a special effect form, the user can quickly determine a position of the target virtual object in the second display region according to the special effect, and the man-machine interaction efficiency is also improved.

Figure 5:
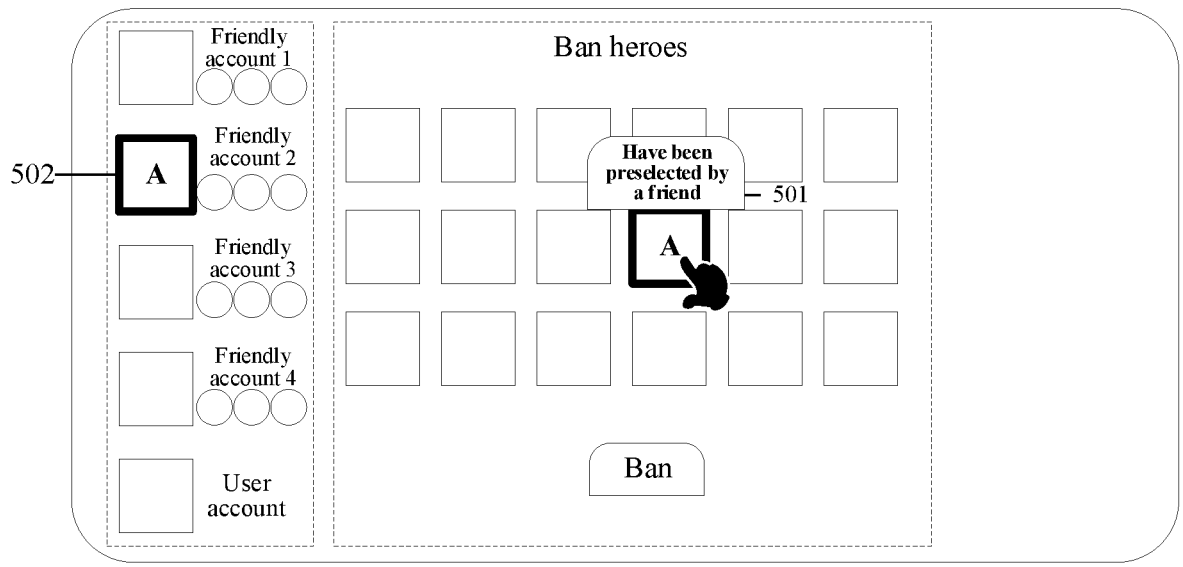
FIG. 5 is a schematic diagram of displaying third prompt information and fourth prompt information according to an embodiment of this application.

For example, a MOBA game is still used as an example. FIG. 5 is a schematic diagram of displaying third prompt information and fourth prompt information according to an embodiment of this application. As shown in FIG. 5, the terminal determines a selected target virtual object as a hero "A" in response to a selection operation of the user. Because the friendly account 2 preselects the hero "A", the terminal determines that the target virtual object matches the at least one third-type virtual object. The terminal displays a second floating window 501 in the first display region, and displays the third prompt information "Have been preselected by a friend" in the second floating window 501. Simultaneously, the terminal displays the hero "A" using special effect 502 at the position of the hero "A" in the second display region, the special effect 502 being at least one of highlighting, flickering, and protruding.

In some embodiments, the terminal displays the third prompt information and the fourth prompt information in a floating window form. In accordance with a determination that the target virtual object matches the at least one third-type virtual object, a third floating window is displayed at a corresponding position of the target virtual object in the first display region, the third prompt information is displayed in the third floating window, a fourth floating window is displayed at the corresponding position of the target virtual object in the second display region, and the fourth prompt information is displayed in the fourth floating window. The third prompt information and the fourth prompt information are simultaneously displayed. By displaying the third prompt information and the fourth prompt information in the floating windows, the user can clearly obtain the third prompt information and the fourth prompt information, so as to know that the target virtual object has been preselected by a friend, and a friendly account that has preselected the target virtual object, which improves the efficiency of obtaining the third prompt information and the fourth prompt information by the user, thereby improving the man-machine interaction efficiency.

In some embodiments, the terminal displays the third prompt information in a special effect form, and displays the fourth prompt information in a floating window form. In accordance with a determination that the target virtual object matches the at least one third-type virtual object, the third prompt information is displayed in a special effect form at a corresponding position of the target virtual object in the first display region, a fourth floating window is displayed at the corresponding position of the target virtual object in the second display region, and the fourth prompt information is displayed in the fourth floating window. The third prompt information and the fourth prompt information are simultaneously displayed. By displaying the third prompt information in the special effect form, the user can clearly obtain the third prompt information, so as to know that the target virtual object has been preselected by a friend, which improves the efficiency of obtaining the third prompt information by the user, thereby improving the man-machine interaction efficiency. By displaying the fourth prompt information in the floating window, the user can clearly obtain the fourth prompt information, which improves the efficiency of obtaining the fourth prompt information by the user, thereby improving the man-machine interaction efficiency.

In some embodiments, the terminal displays the third prompt information and the fourth prompt information in a special effect form. In accordance with a determination that the target virtual object matches the at least one third-type virtual object, the third prompt information is displayed in a special effect form at a corresponding position of the target virtual object in the first display region, and the fourth prompt information is displayed in a special effect form at the corresponding position of the target virtual object in the second display region. The third prompt information and the fourth prompt information are simultaneously displayed. By displaying the third prompt information and the fourth prompt information in the special effect form, the user can clearly know that the target virtual object has been preselected by a friend, and a friendly account that has preselected the target virtual object, which improves the efficiency of obtaining the third prompt information by the user, thereby improving the man-machine interaction efficiency.

The special effect includes at least flickering, highlighting, a prompt, and protruding. This is not limited in this embodiment of this application.

In some embodiments, the special effect is flickering, and that the terminal displays the fourth prompt information in a special effect form at the corresponding position of the target virtual object in the second display region includes: displaying, by the terminal, the target virtual object in a flickering manner at the corresponding position of the target virtual object in the second display region.

In some embodiments, the special effect is highlighting, and that the terminal displays the third prompt information in a special effect form at a corresponding position of the target virtual object in the first display region includes: displaying, by the terminal, the target virtual object in a highlighting manner at the corresponding position of the target virtual object in the first display region.

If two or more friendly accounts all preselect target virtual objects, the terminal separately displays the fourth prompt information at a position of each target virtual object in the second display region.

In some embodiments, a display duration of the third prompt information is limited, and the terminal removes the third prompt information in accordance with a determination that the display duration of the third prompt information exceeds a first duration. By setting the first duration, the third prompt information will not block other virtual objects due to being displayed for a long time, and consequently affecting the user in selecting other virtual objects, thereby improving the man-machine interaction efficiency.

In some embodiments, a display duration of the fourth prompt information is limited, and the terminal removes the fourth prompt information in accordance with a determination that the display duration of the fourth prompt information exceeds a second duration. By setting the second duration, the fourth prompt information will not attract the attention of the user due to being displayed for a long time, and consequently affecting the user in selecting other virtual objects and setting other game content, thereby improving the man-machine interaction efficiency.

The first duration and the second duration may be same or different. This is not limited in this embodiment of this application.

In some embodiments, the terminal can also play a prompt sound effect prompt the user. Correspondingly, the terminal plays a first prompt sound effect in accordance with a determination that the target virtual object matches the at least one third-type virtual object, the first prompt sound effect being used for prompting that the target virtual object matches the at least one third-type virtual object. An existing prompt sound effect may be reused or a dedicated prompt sound effect may be set as the first prompt sound effect, or a different prompt sound effect may be set for each virtual object. This is not limited in this embodiment of this application. By playing the prompt sound effect, the user is reminded that he has selected a virtual object preselected by the friendly account from both the visual and auditory perspectives, which improves the effect of reminding the user, thereby improving the man-machine interaction efficiency.

304: In accordance with a determination that the target virtual object does not exist in the at least one third-type virtual object, and the target virtual object matches the at least one second-type virtual object, display first prompt information based on the target virtual object in the first display region, and display second prompt information based on the target virtual object in the second display region.

In this embodiment of this application, in accordance with a determination that the terminal determines that the target virtual object does not exist in the at least one third-type virtual object, the terminal detects whether the target virtual object matches the at least one second-type virtual object, that is, the terminal detects whether the selected first-type virtual object matches the at least one second-type virtual object. After determining that the target virtual object matches the at least one second-type virtual object, the terminal can further respectively display the first prompt information and the second prompt information in the first display region and the second display region. The first prompt information is used for indicating a presence of a friendly account associated with the target virtual object, and the second prompt information is used for prompting the corresponding position of the target virtual object in the second display region. The terminal can display the first prompt information and the second prompt information in different forms, such as a floating window form and a special effect form. This is not limited in this embodiment of this application.

In this embodiment of this application, an example in which the terminal first determines whether the target virtual object matches the at least one third-type virtual object, and then determines whether the target virtual object matches the at least one second-type virtual object is used for description. In some embodiments, the terminal can first determine whether the target virtual object matches the at least one second-type virtual object, and then determines whether the target virtual object matches the at least one third-type virtual object. In some embodiments, after determining whether the target virtual object matches the at least one third-type virtual object, the terminal no longer determines whether the target virtual object matches the at least one second-type virtual object. In some embodiments, after determining whether the target virtual object matches the at least one second-type virtual object, the terminal no longer determines whether the target virtual object matches the at least one third-type virtual object. This is not limited in this embodiment of this application.

In some embodiments, the terminal displays the first prompt information in a floating window form, and displays the second prompt information in a special effect form. In accordance with a determination that the target virtual object matches the at least one second-type virtual object, the terminal displays a first floating window at a corresponding position of the target virtual object in the first display region, displays the first prompt information in the first floating window, and the terminal displays the second prompt information in a special effect form at the corresponding position of the target virtual object in the second display region. The first prompt information and the second prompt information are simultaneously displayed. By displaying the first prompt information in the floating window, the user can clearly obtain the first prompt information, so as to know that the target virtual object is a virtual object associated with the friendly account, and not be attracted by other virtual objects as the background to ignore the first prompt information, which improves the efficiency of obtaining the first prompt information by the user, thereby improving the man-machine interaction efficiency. By displaying the second prompt information in a special effect form, the user can quickly determine a position of the target virtual object in the second display region according to the special effect, and the man-machine interaction efficiency is also improved.

Figure 6:
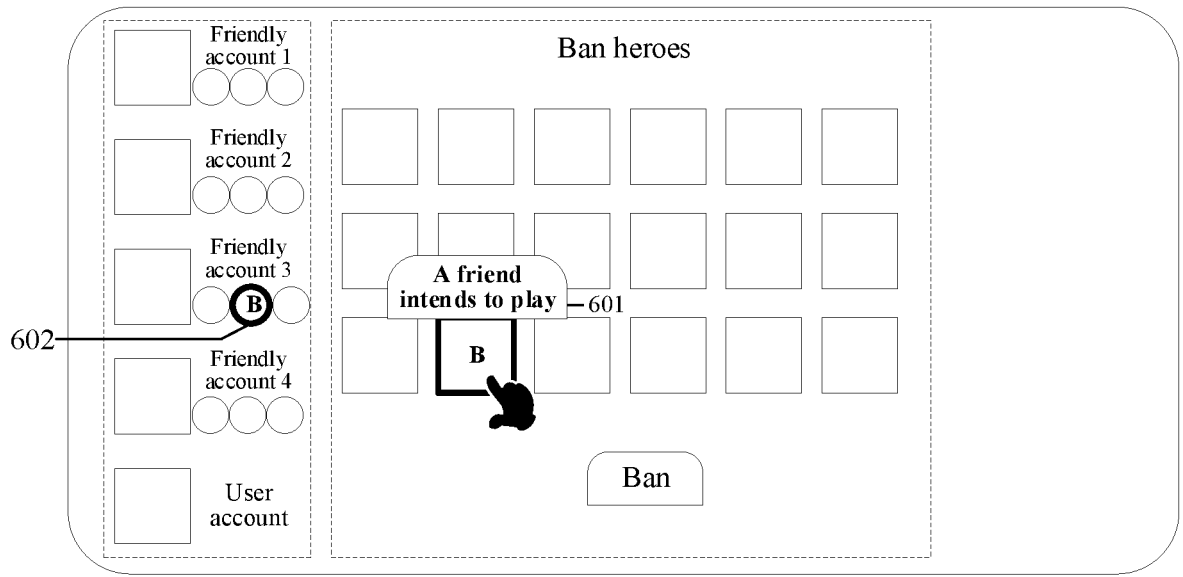
FIG. 6 is a schematic diagram of displaying first prompt information and second prompt information according to an embodiment of this application.

For example, a MOBA game is still used as an example. A virtual object associated with the friendly account is a hero that the friendly account intends to play. FIG. 6 is a schematic diagram of displaying first prompt information and second prompt information according to an embodiment of this application. As shown in FIG. 6, the terminal determines a selected target virtual object as a hero "B" in response to a selection operation of the user. Because the friendly account 3 is associated with the hero "B", that is, the hero "B" is a hero that the friendly account 3 intends to play, the terminal determines that the target virtual object matches the at least one second-type virtual object. The terminal displays a first floating window 601 in the first display region, and displays the first prompt information "A friend intends to play" in the first floating window. Simultaneously, the terminal displays the hero "B" using a special effect 602 at the position of the hero "B" in the second display region, the special effect 602 being at least one of highlighting, flickering, and protruding.

In some embodiments, the terminal displays the first prompt information and the second prompt information in a floating window form. In accordance with a determination that the target virtual object matches the at least one second-type virtual object, the terminals display a first floating window at a corresponding position of the target virtual object in the first display region, displays the first prompt information in the first floating window, displays a second floating window at the corresponding position of the target virtual object in the second display region, and displays the second prompt information in the second floating window. By displaying the first prompt information and the second prompt information in the floating windows, the user can clearly obtain the first prompt information and the second prompt information, so as to know that the target virtual object is a virtual object associated with a friendly account and the friendly account associated with the virtual object, and not be attracted by other virtual objects as the background to ignore the first prompt information and the second prompt information, which improves the efficiency of obtaining prompt information by the user, thereby improving the man-machine interaction efficiency.

In some embodiments, the terminal displays the first prompt information in a special effect form, and displays the second prompt information in a floating window form. In accordance with a determination that the target virtual object matches the at least one second-type virtual object, the terminal displays the first prompt information in a special effect form at a corresponding position of the target virtual object in the first display region, displays a second floating window at the corresponding position of the target virtual object in the second display region, and displays the second prompt information in the second floating window. By displaying the first prompt information in the special effect form, the user can know that the target virtual object is a virtual object associated with the friendly account, which improves the efficiency of obtaining the first prompt information by the user, thereby improving the man-machine interaction efficiency. By displaying the second prompt information in a floating window form, the user can quickly determine a position of the target virtual object in the second display region according to the special effect, and the man-machine interaction efficiency is also improved.

In some embodiments, the terminal displays the first prompt information and the second prompt information in a special effect form. In accordance with a determination that the target virtual object matches the at least one second-type virtual object, the terminal displays the first prompt information in a special effect form at a corresponding position of the target virtual object in the first display region, and displays the second prompt information in a special effect form at the corresponding position of the target virtual object in the second display region. By displaying the first prompt information and the second prompt information in the special effect form, the user can clearly obtain the first prompt information and the second prompt information, so as to know that the target virtual object is a virtual object associated with a friendly account and the friendly account associated with the virtual object, and not be attracted by other virtual objects as the background to ignore the first prompt information and the second prompt information, which improves the efficiency of obtaining prompt information by the user, thereby improving the man-machine interaction efficiency.

The special effect includes flickering, highlighting, a prompt, and protruding. This is not limited in this embodiment of this application. Certainly, the terminal may also perform prompting by vibrating, playing sound effects, and the like. This is not limited in this embodiment of this application.

In some embodiments, the special effect is a prompt, and that the terminal displays the second prompt information in a special effect form at the corresponding position of the target virtual object in the second display region includes: displaying, by the terminal, the second prompt information in a prompt form at the corresponding position of the target virtual object in the second display region.

In some embodiments, the special effect is protruding, and that the terminal displays the first prompt information in a special effect form at a corresponding position of the target virtual object in the first display region includes: displaying, by the terminal, the target virtual object in a protruding manner at the corresponding position of the target virtual object in the first display region.

If two or more friendly accounts are all associated with target virtual objects, the terminal separately displays the second prompt information at a position of each target virtual object in the second display region.

In some embodiments, a display duration of the first prompt information is limited, and the terminal cancels display of the first prompt information in accordance with a determination that the display duration of the first prompt information exceeds a third duration. By setting the third duration, the first prompt information will not block other virtual objects due to being displayed for a long time, and consequently affecting the user in selecting other virtual objects, thereby improving the man-machine interaction efficiency.

In some embodiments, a display duration of the second prompt information is limited, and the terminal cancels display of the second prompt information in accordance with a determination that the display duration of the second prompt information exceeds a fourth duration. By setting the fourth duration, the second prompt information will not attract the attention of the user due to being displayed for a long time, and consequently affecting the user in selecting other virtual objects and setting other game content, thereby improving the man-machine interaction efficiency.

The third duration and the fourth duration may be same or different. This is not limited in this embodiment of this application.

In some embodiments, the terminal can also play a prompt sound effect prompt the user. The terminal plays a second prompt sound effect in accordance with a determination that the target virtual object matches the at least one second-type virtual object, the second prompt sound effect being used for prompting that the target virtual object matches the at least one second-type virtual object. An existing prompt sound effect may be reused or a dedicated prompt sound effect may be set as the second prompt sound effect, or a different prompt sound effect may be set for each virtual object. This is not limited in this embodiment of this application. By playing the prompt sound effect, the user is reminded that he has selected a virtual object associated with the friendly account from both the visual and auditory perspectives, which improves the effect of reminding the user, thereby improving the man-machine interaction efficiency.

Figure 7:
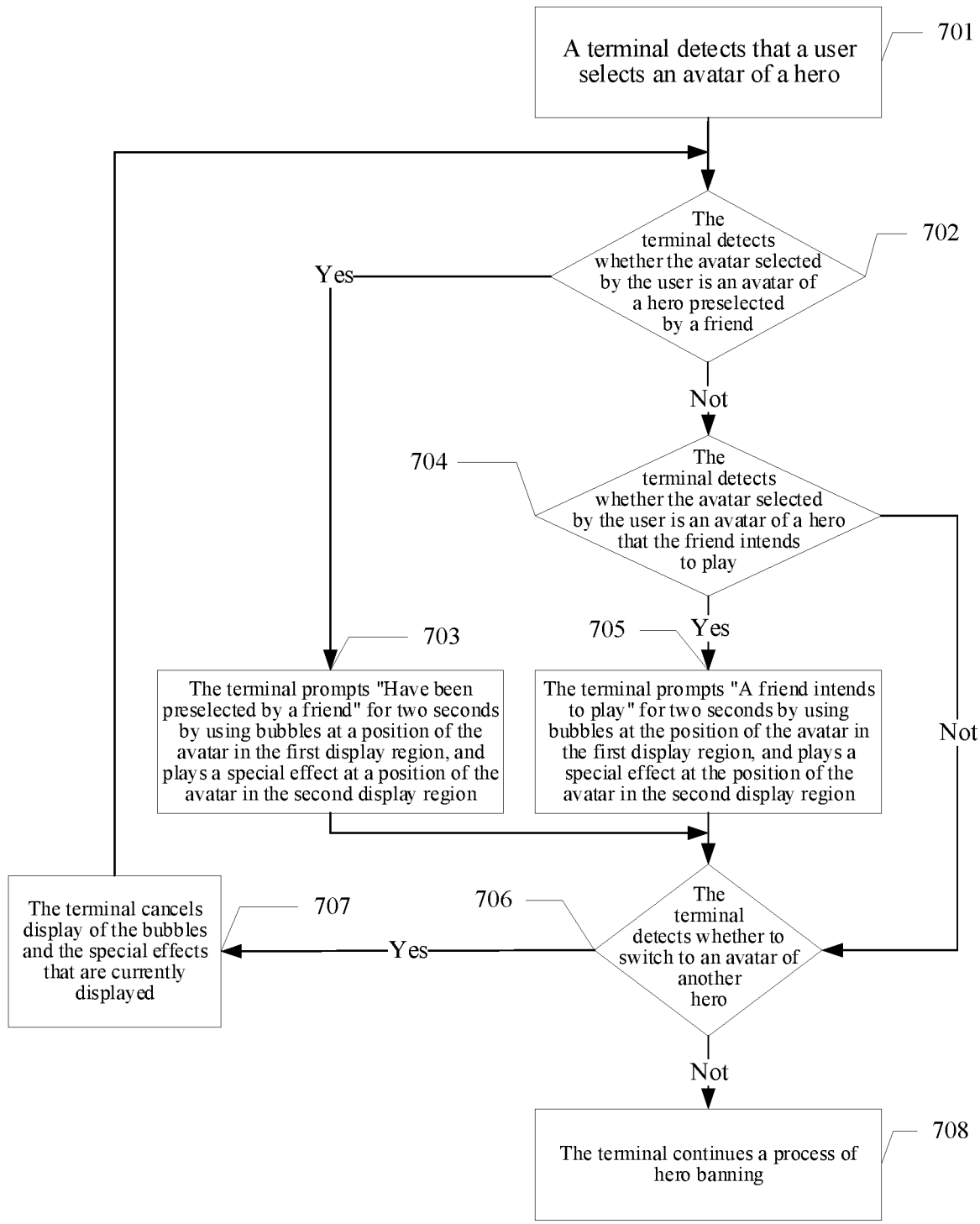
FIG. 7 is another flowchart of an information display method according to an embodiment of this application.

To make the information display method described in the foregoing step 301 to step 304 easier to understand, a description is made below based on an example. FIG. 7 is another flowchart of an information display method according to an embodiment of this application. As shown in FIG. 7, an example in which a virtual object is displayed as an avatar of a hero, prompt information displayed in a first display region is in a bubble form, and prompt information displayed in a second display region is in a special effect form is used for description, which includes the following steps: 701: A terminal detects that a user selects an avatar of a hero. 702: The terminal detects whether the avatar selected by the user is an avatar of a hero preselected by a friend; and if yes, preforms step 703, and if not, performs step 704. 703: The terminal prompts "Have been preselected by a friend" for two seconds by using bubbles at a position of the avatar in the first display region, and plays a special effect at a position of the avatar in the second display region. 704: The terminal detects whether the avatar selected by the user is an avatar of a hero that the friend intends to play; and if yes, preforms step 705, and if not, performs step 706. 705: The terminal prompts "A friend intends to play" for two seconds by using bubbles at the position of the avatar in the first display region, and plays a special effect at the position of the avatar in the second display region. 706: The terminal detects whether to switch to an avatar of another hero; and if yes, preforms step 707, and if not, performs step 708. 707: The terminal cancels display of the bubbles and the special effects that are currently displayed. 708: The terminal continues a process of hero banning.

According to the solution provided in this embodiment of this application, by determining whether a friendly account is associated with a selected target virtual object when a user selects a first-type virtual object, and then when the friendly account is associated with the target virtual object, performing prompting for the target virtual object in a first display region and a second display region respectively, which can effectively prompt the user of existence of the friendly account associated with the target virtual object, to prevent the user from mistakenly banning a virtual object that the friendly account intends to use and causing disbanding of a battle, thereby saving time of the user, and improving man-machine interaction efficiency. In addition, because the information display method provided in this embodiment of this application is to prompt the user, which will not interrupt the user's experience of selecting a virtual object, and can also avoid a dispute between friendly accounts caused by selecting a virtual object and banning a virtual object, thereby having a positive role in promoting teamwork mentality.

Figure 8:
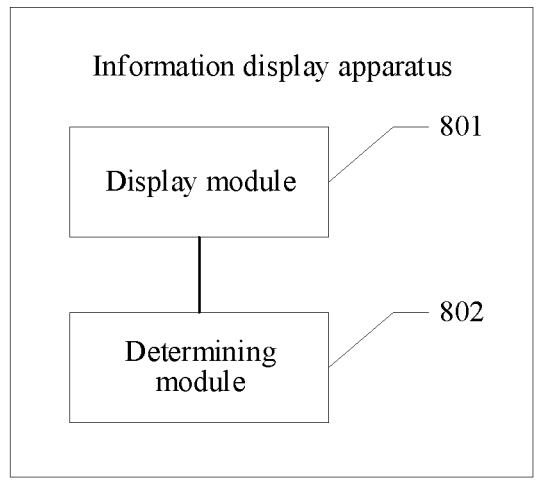
FIG. 8 is a block diagram of an information display apparatus according to an embodiment of this application.

FIG. 8 is a block diagram of an information display apparatus according to an embodiment of this application. The apparatus is configured to perform the steps in the foregoing information display method. Referring to FIG. 8, the apparatus includes: a display module 801 and a determining module 802.

The display module 801 is configured to display a first display region and a second display region of a target battle, the first display region being configured to display a plurality of to-be-banned first-type virtual objects, the second display region being configured to display at least one second-type virtual object associated with a friendly account in the target battle; and the determining module 802 is configured to determine a selected target virtual object in response to a selection operation for the plurality of first-type virtual objects, the display module 801 being further configured to: in accordance with a determination that the target virtual object matches the at least one second-type virtual object, display first prompt information based on the target virtual object in the first display region, and display second prompt information based on the target virtual object in the second display region, the first prompt information being used for indicating a presence of a friendly account associated with the target virtual object, and the second prompt information being used for prompting the corresponding position of the target virtual object in the second display region.

In some embodiments, the display module 801 is further configured to: in accordance with a determination that the target virtual object matches the at least one second-type virtual object, display a first floating window at a corresponding position of the target virtual object in the first display region, display the first prompt information in the first floating window, and display the second prompt information in a special effect form at the corresponding position of the target virtual object in the second display region.

In some embodiments, the display module 801 is further configured to: in accordance with a determination that the target virtual object matches the at least one second-type virtual object, display a first floating window at a corresponding position of the target virtual object in the first display region, display the first prompt information in the first floating window, display a second floating window at the corresponding position of the target virtual object in the second display region, and display the second prompt information in the second floating window.

In some embodiments, the display module 801 is further configured to: in accordance with a determination that the target virtual object matches the at least one second-type virtual object, display the first prompt information in a special effect form at a corresponding position of the target virtual object in the first display region, display a second floating window at the corresponding position of the target virtual object in the second display region, and display the second prompt information in the second floating window.

In some embodiments, the display module 801 is further configured to: in accordance with a determination that the target virtual object matches the at least one second-type virtual object, display the first prompt information in a special effect form at a corresponding position of the target virtual object in the first display region, and display the second prompt information in a special effect form at the corresponding position of the target virtual object in the second display region.

In some embodiments, the second display region is further configured to display at least one third-type virtual object preselected by a friendly account in the target battle; and the display module 801 is further configured to: in accordance with a determination that the target virtual object matches the at least one third-type virtual object, display third prompt information based on the target virtual object in the first display region, and display fourth prompt information based on the target virtual object in the second display region, the third prompt information being used for indicating a presence of a friendly account that preselects the target virtual object, and the fourth prompt information being used for prompting the corresponding position of the target virtual object in the second display region.

In some embodiments, the display module 801 is further configured to: in accordance with a determination that the target virtual object matches the at least one third-type virtual object, display a third floating window at a corresponding position of the target virtual object in the first display region, display the third prompt information in the third floating window, and display the fourth prompt information in a special effect form at the corresponding position of the target virtual object in the second display region.

In some embodiments, the display module 801 is further configured to: in accordance with a determination that the target virtual object matches the at least one third-type virtual object, display a third floating window at a corresponding position of the target virtual object in the first display region, display the third prompt information in the third floating window, display a fourth floating window at the corresponding position of the target virtual object in the second display region, and display the fourth prompt information in the fourth floating window.

In some embodiments, the display module 801 is further configured to: in accordance with a determination that the target virtual object matches the at least one third-type virtual object, display the third prompt information in a special effect form at a corresponding position of the target virtual object in the first display region, display a fourth floating window at the corresponding position of the target virtual object in the second display region, and display the fourth prompt information in the fourth floating window.

In some embodiments, the display module 801 is further configured to: in accordance with a determination that the target virtual object matches the at least one third-type virtual object, display the third prompt information in a special effect form at a corresponding position of the target virtual object in the first display region, and display the fourth prompt information in a special effect form at the corresponding position of the target virtual object in the second display region.

In some embodiments, the display module 801 is further configured to remove the third prompt information in accordance with a determination that a display duration of the third prompt information exceeds a first duration.

In some embodiments, the display module 801 is further configured to remove the fourth prompt information in accordance with a determination that a display duration of the fourth prompt information exceeds a second duration.

Figure 9:
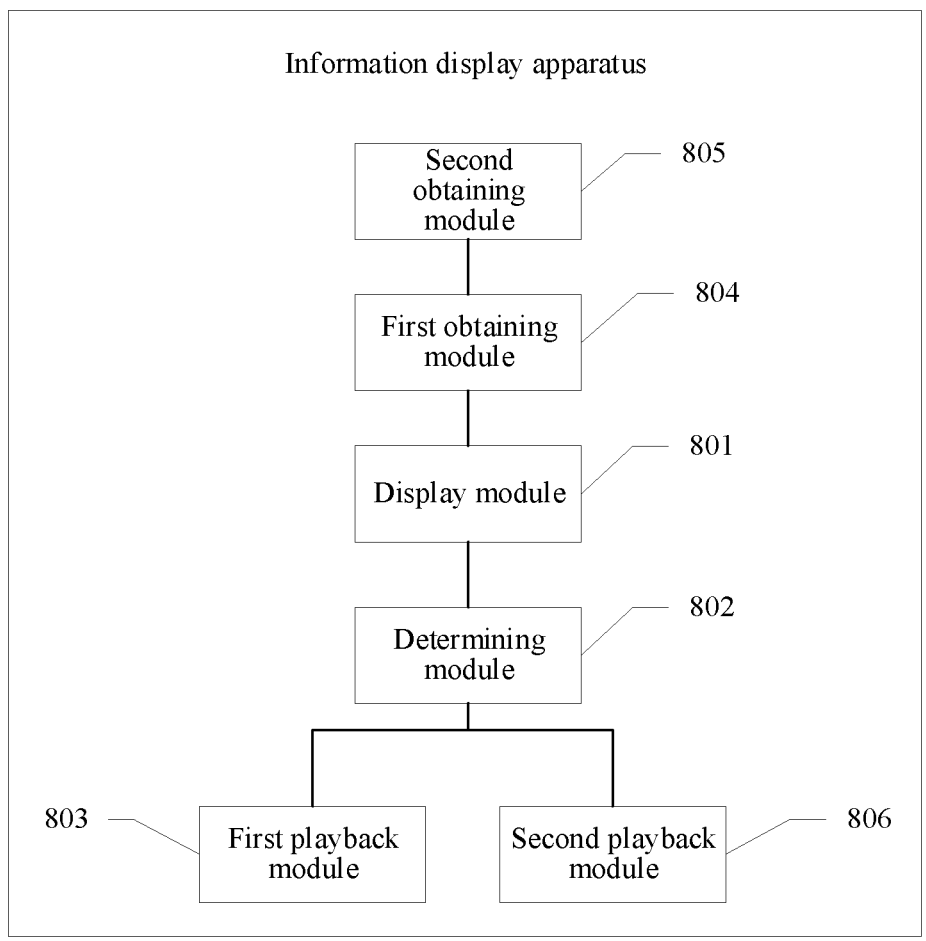
FIG. 9 is another block diagram of an information display apparatus according to an embodiment of this application.

In some embodiments, FIG. 9 is another block diagram of an information display apparatus according to an embodiment of this application. As shown in FIG. 9, the apparatus further includes:

a first playback module 803, configured to play a first prompt sound effect in accordance with a determination that the target virtual object matches the at least one third-type virtual object, the first prompt sound effect being used for prompting that the target virtual object matches the at least one third-type virtual object.

In some embodiments, display forms of the plurality of first-type virtual objects and the at least one second-type virtual object include an avatar form and a card form.

In some embodiments, as shown in FIG. 9, the apparatus further includes:

a first obtaining module 804, configured to: obtain at least one friendly account in the target battle; and obtain at least one virtual object associated with the at least one friendly account as the at least one second-type virtual object.

In some embodiments, as shown in FIG. 9, the apparatus further includes:

a second obtaining module 805, configured to determine a virtual object associated with one of the at least one friendly account according to virtual objects used by the friendly account in a plurality of historical battles, the historical battle being a battle before the target battle.

In some embodiments, the display module 801 is further configured to remove the first prompt information in accordance with a determination that a display duration of the first prompt information exceeds a third duration.

In some embodiments, the display module 801 is further configured to remove the second prompt information in accordance with a determination that a display duration of the second prompt information exceeds a fourth duration.

In some embodiments, as shown in FIG. 9, the apparatus further includes:

a second playback module 806, configured to play a second prompt sound effect in accordance with a determination that the target virtual object matches the at least one second-type virtual object, the second prompt sound effect being used for prompting that the target virtual object matches the at least one second-type virtual object.

According to the solution provided in this embodiment of this application, by determining whether a friendly account is associated with a selected target virtual object when a user selects a first-type virtual object, and then when the friendly account is associated with the target virtual object, performing prompting for the target virtual object in a first display region and a second display region respectively, which can effectively prompt the user of existence of the friendly account associated with the target virtual object, to prevent the user from mistakenly banning a virtual object that the friendly account intends to use and causing disbanding of a battle, thereby saving time of the user, and improving man-machine interaction efficiency.

When the information display apparatus provided in the foregoing embodiments displays prompt information, the division of the foregoing functional modules is merely used as an example for description. In actual applications, the foregoing functions may be allocated to different functional modules according to a requirement. That is, an inner structure of the apparatus is divided into different functional modules to complete all or some of the functions described above. In addition, the information display apparatus and the information display method embodiments provided in the foregoing embodiments belong to one conception. For the specific implementation process, reference may be made to the method embodiments, and details are not described herein again.

Figure 10:
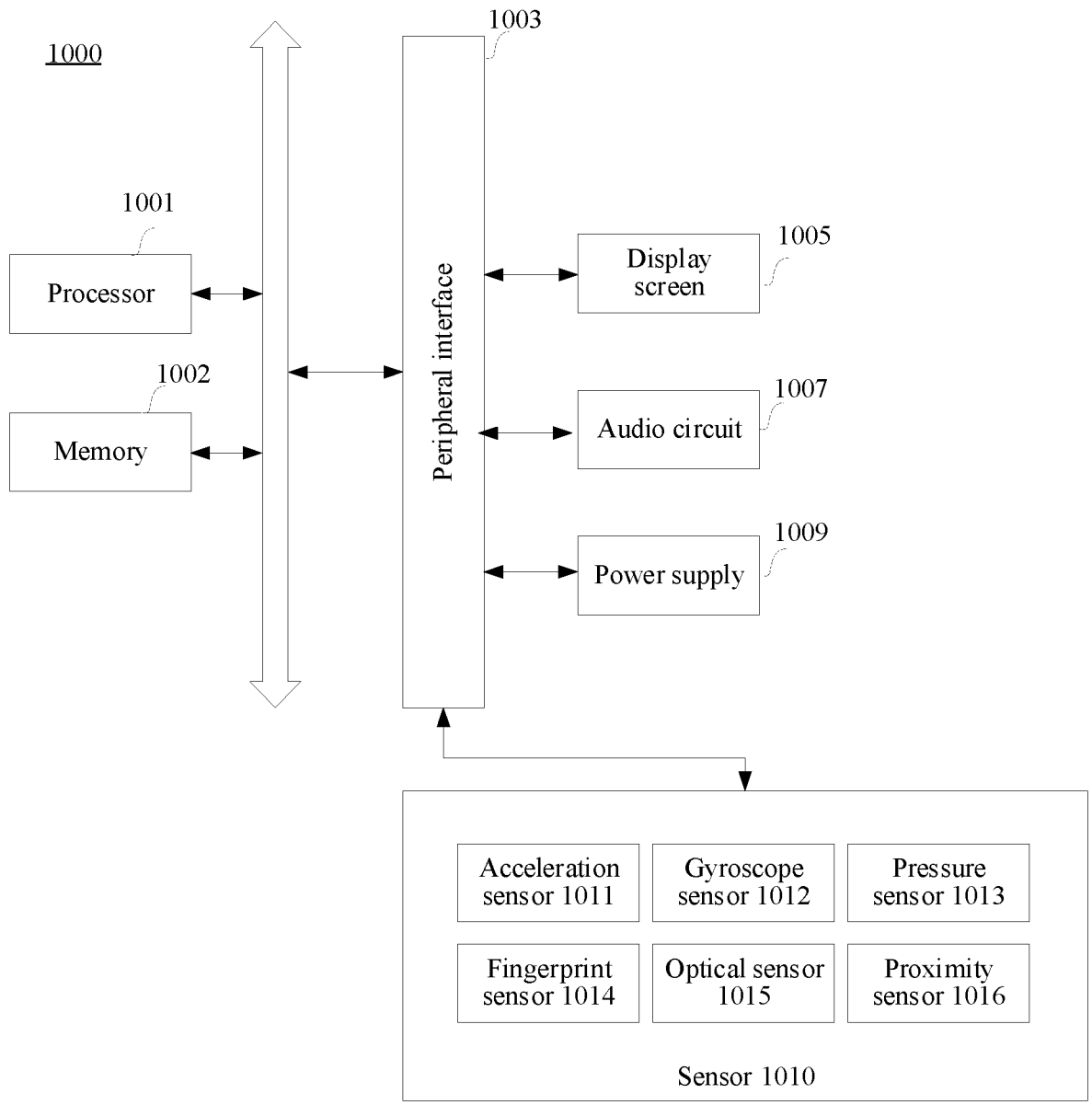
FIG. 10 is a structural block diagram of a terminal according to an embodiment of this application.

FIG. 10 is a structural block diagram of a terminal according to an embodiment of this application. The terminal 1000 may be a portable mobile terminal, for example, a smartphone, a tablet computer, a Moving Picture Experts Group Audio Layer III (MP3) player, a Moving Picture Experts Group Audio Layer IV (MP4) player, a notebook computer, or a desktop computer. The terminal 1000 may also be referred to as user equipment, a portable terminal, a laptop terminal, a desktop terminal, or other names.

Generally, the terminal 1000 includes a processor 1001 and a memory 1002.

The processor 1001 may include one or more processing cores, for example, a 4-core processor or an 8-core processor. The processor 1001 may be implemented by using at least one hardware form of digital signal processing (DSP), a field-programmable gate array (FPGA), and a programmable logic array (PLA). The processor 1001 may alternatively include a main processor and a coprocessor. The main processor is a processor configured to process data in an awake state, also referred to as a central processing unit (CPU), and the coprocessor is a low-power processor configured to process data in a standby state. In some embodiments, the processor 1001 may be integrated with a graphics processing unit (GPU). The GPU is configured to render and draw content that needs to be displayed on a display screen. In some embodiments, the processor 1001 may further include an artificial intelligence (AI) processor. The AI processor is configured to process a calculation operation related to machine learning.

The memory 1002 may include one or more computer-readable storage media. The computer-readable storage medium may be non-transient. The memory 1002 may further include a high-speed random access memory and a nonvolatile memory, for example, one or more disk storage devices or flash storage devices. In some embodiments, the non-transient computer-readable storage medium in the memory 1002 is configured to store at least one computer program, and the at least one computer program is configured to be executed by the processor 1001 to implement the following steps:

displaying a first display region and a second display region of a target battle, the first display region being configured to display a plurality of to-be-banned first-type virtual objects, and the second display region being configured to display at least one second-type virtual object associated with a friendly account in the target battle;

determining a selected target virtual object in response to a selection operation for the plurality of first-type virtual objects; and in accordance with a determination that the target virtual object matches the at least one second-type virtual object, displaying first prompt information based on the target virtual object in the first display region, and displaying second prompt information based on the target virtual object in the second display region, the first prompt information being used for indicating a presence of a friendly account associated with the target virtual object, and the second prompt information being used for prompting the corresponding position of the target virtual object in the second display region.

In some embodiments, the in accordance with a determination that the target virtual object matches the at least one second-type virtual object, displaying first prompt information based on the target virtual object in the first display region, and displaying second prompt information based on the target virtual object in the second display region includes:

in accordance with a determination that the target virtual object matches the at least one second-type virtual object, displaying a first floating window at a corresponding position of the target virtual object in the first display region;

displaying the first prompt information in the first floating window; and displaying the second prompt information in a special effect form at the corresponding position of the target virtual object in the second display region.

In some embodiments, the in accordance with a determination that the target virtual object matches the at least one second-type virtual object, displaying first prompt information based on the target virtual object in the first display region, and displaying second prompt information based on the target virtual object in the second display region includes:

in accordance with a determination that the target virtual object matches the at least one second-type virtual object, displaying a first floating window at a corresponding position of the target virtual object in the first display region;

displaying the first prompt information in the first floating window; and displaying a second floating window at the corresponding position of the target virtual object in the second display region; and displaying the second prompt information in the second floating window.

In some embodiments, the in accordance with a determination that the target virtual object matches the at least one second-type virtual object, displaying first prompt information based on the target virtual object in the first display region, and displaying second prompt information based on the target virtual object in the second display region includes:

in accordance with a determination that the target virtual object matches the at least one second-type virtual object, displaying the first prompt information in a special effect form at a corresponding position of the target virtual object in the first display region;

displaying a second floating window at the corresponding position of the target virtual object in the second display region; and displaying the second prompt information in the second floating window.

In some embodiments, the in accordance with a determination that the target virtual object matches the at least one second-type virtual object, displaying first prompt information based on the target virtual object in the first display region, and displaying second prompt information based on the target virtual object in the second display region includes:

in accordance with a determination that the target virtual object matches the at least one second-type virtual object, displaying the first prompt information in a special effect form at a corresponding position of the target virtual object in the first display region; and displaying the second prompt information in a special effect form at the corresponding position of the target virtual object in the second display region.

In some embodiments, the second display region is further configured to display at least one third-type virtual object preselected by a friendly account in the target battle; and the method further includes:

in accordance with a determination that the target virtual object matches the at least one third-type virtual object, displaying third prompt information based on the target virtual object in the first display region, and displaying fourth prompt information based on the target virtual object in the second display region, the third prompt information being used for indicating a presence of a friendly account that preselects the target virtual object, and the fourth prompt information being used for prompting the corresponding position of the target virtual object in the second display region.

In some embodiments, the in accordance with a determination that the target virtual object matches the at least one third-type virtual object, displaying third prompt information based on the target virtual object in the first display region, and displaying fourth prompt information based on the target virtual object in the second display region includes:

in accordance with a determination that the target virtual object matches the at least one third-type virtual object, displaying a third floating window at a corresponding position of the target virtual object in the first display region;

displaying the third prompt information in the third floating window; and displaying the fourth prompt information in a special effect form at the corresponding position of the target virtual object in the second display region.

In some embodiments, the in accordance with a determination that the target virtual object matches the at least one third-type virtual object, displaying third prompt information based on the target virtual object in the first display region, and displaying fourth prompt information based on the target virtual object in the second display region includes:

in accordance with a determination that the target virtual object matches the at least one third-type virtual object, displaying a third floating window at a corresponding position of the target virtual object in the first display region;

displaying the third prompt information in the third floating window;

displaying a fourth floating window at the corresponding position of the target virtual object in the second display region; and displaying the fourth prompt information in the fourth floating window.

In some embodiments, the in accordance with a determination that the target virtual object matches the at least one third-type virtual object, displaying third prompt information based on the target virtual object in the first display region, and displaying fourth prompt information based on the target virtual object in the second display region includes:

in accordance with a determination that the target virtual object matches the at least one third-type virtual object, displaying the third prompt information in a special effect form at a corresponding position of the target virtual object in the first display region;

displaying a fourth floating window at the corresponding position of the target virtual object in the second display region; and displaying the fourth prompt information in the fourth floating window.

In some embodiments, the in accordance with a determination that the target virtual object matches the at least one third-type virtual object, displaying third prompt information based on the target virtual object in the first display region, and displaying fourth prompt information based on the target virtual object in the second display region includes:

in accordance with a determination that the target virtual object matches the at least one third-type virtual object, displaying the third prompt information in a special effect form at a corresponding position of the target virtual object in the first display region; and displaying the fourth prompt information in a special effect form at the corresponding position of the target virtual object in the second display region.

In some embodiments, the method further includes:

ceasing to display the third prompt information in accordance with a determination that a display duration of the third prompt information exceeds a first duration.

In some embodiments, the method further includes:

ceasing to display the fourth prompt information in accordance with a determination that a display duration of the fourth prompt information exceeds a second duration.

In some embodiments, the method further includes:

playing a first prompt sound effect in accordance with a determination that the target virtual object matches the at least one third-type virtual object, the first prompt sound effect being used for prompting that the target virtual object matches the at least one third-type virtual object.

In some embodiments, display forms of the plurality of first-type virtual objects and the at least one second-type virtual object include an avatar form and a card form.

In some embodiments, the method further includes:

obtaining at least one friendly account in the target battle; and obtaining at least one virtual object associated with the at least one friendly account as the at least one second-type virtual object.

In some embodiments, the method further includes:

determining a virtual object associated with one of the at least one friendly account according to virtual objects used by the friendly account in a plurality of historical battles, the historical battle being a battle before the target battle.

In some embodiments, the method further includes:

ceasing to display the first prompt information in accordance with a determination that a display duration of the first prompt information exceeds a third duration.

In some embodiments, the method further includes:

ceasing to display the second prompt information in accordance with a determination that a display duration of the second prompt information exceeds a fourth duration.

In some embodiments, the method further includes:

playing a second prompt sound effect in accordance with a determination that the target virtual object matches the at least one second-type virtual object, the second prompt sound effect being used for prompting that the target virtual object matches the at least one second-type virtual object.

In some embodiments, the terminal 1000 may include a peripheral interface 1003 and at least one peripheral. The processor 1001, the memory 1002, and the peripheral interface 1003 may be connected by using a bus or a signal cable. Each peripheral may be connected to the peripheral interface 1003 by using a bus, a signal cable, or a circuit board. Specifically, the peripheral includes: at least one of a display screen 1005, an audio circuit 1007, and a power supply 1009.

The peripheral interface 1003 may be configured to connect at least one input/output (I/O)-related peripheral to the processor 1001 and the memory 1002. In some embodiments, the processor 1001, the memory 1002 and the peripheral interface 1003 are integrated on a same chip or circuit board. In some other embodiments, any one or two of the processor 1001, the memory 1002, and the peripheral interface 1003 may be implemented on a single chip or circuit board. This is not limited in this embodiment.

The display screen 1005 is configured to display a user interface (UI). The UI may include a graphic, a text, an icon, a video, and any combination thereof. When the display screen 1005 is a touch display screen, the display screen 1005 is further capable of acquiring touch signals on or above a surface of the display screen 1005. The touch signal may be inputted to the processor 1001 for processing as a control signal. In this case, the display screen 1005 may be further configured to provide a virtual button and/or a virtual keyboard, which is also referred to as a soft button and/or a soft keyboard. In some embodiments, there may be one display screen 1005 disposed on a front panel of the terminal 1000. In some other embodiments, there may be at least two display screens 1005 respectively disposed on different surfaces of the terminal 1000 or designed in a foldable shape. In some other embodiments, the display screen 1005 may be a flexible display screen, disposed on a curved surface or a folded surface of the terminal 1000. Even, the display screen 1005 may be further set in a non-rectangular irregular pattern, namely, a special-shaped screen. The display screen 1005 may be made of materials such as a liquid crystal display (LCD), an organic light-emitting diode (OLED), or the like.

The audio circuit 1007 may include a microphone and a speaker. The microphone is configured to: acquire sound waves of a user and an environment, and convert the sound waves into electrical signals and input the electrical signals into the processor 1001 for processing. For the purpose of stereo acquisition or noise reduction, there may be a plurality of microphones, respectively disposed at different portions of the terminal 1000. The microphone may further be an array microphone or an omni-directional acquisition type microphone. The speaker is configured to convert electric signals from the processor 1001 or the RF circuit 1004 into sound waves. The speaker may be a conventional thin-film speaker or a piezoelectric ceramic speaker. When the speaker is the piezoelectric ceramic speaker, the speaker cannot only convert an electrical signal into sound waves audible to a human being, but also convert an electrical signal into sound waves inaudible to the human being for ranging and other purposes. In some embodiments, the audio circuit 1007 may further include an earphone jack.

The power supply 1009 is configured to supply power to components in the terminal 1000. The power supply 1009 may be an alternating-current power supply, a direct-current power supply, a disposable battery, or a rechargeable battery. When the power supply 1009 includes a rechargeable battery, and the rechargeable battery may be a wired rechargeable battery or a wireless rechargeable battery. The wired charging battery is a battery charged through a wired line, and the wireless charging battery is a battery charged through a wireless coil. The rechargeable battery may be further configured to support a fast charging technology.

In some embodiments, the terminal 1000 further includes one or more sensors 1010. The one or more sensors 1010 include, but not limited to, an acceleration sensor 1011, a gyroscope sensor 1012, a pressure sensor 1013, a fingerprint sensor 1014, an optical sensor 1015, and a proximity sensor 1016.

The acceleration sensor 1011 may detect accelerations on three coordinate axes of a coordinate system established with the terminal 1000. For example, the acceleration sensor 1011 may be configured to detect components of gravity acceleration on the three coordinate axes. The processor 1001 may control, according to a gravity acceleration signal acquired by the acceleration sensor 1011, the display screen 1005 to display the user interface in a landscape view or a portrait view. The acceleration sensor 1011 may be further configured to acquire motion data of a game or a user.

The gyroscope sensor 1012 may detect a body direction and a rotation angle of the terminal 1000, and may collect a 3D action of the user on the terminal 1000 together with the acceleration sensor 1011. The processor 1001 may implement the following functions according to the data acquired by the gyroscope sensor 1012: motion sensing (such as changing the UI according to a tilt operation of the user), image stabilization during shooting, game control, and inertial navigation.

The pressure sensor 1013 may be disposed at a side frame of the terminal 1000 and/or a lower layer of the display screen 1005. When the pressure sensor 1013 is disposed at the side frame of the terminal 1000, a holding signal of the user on the terminal 1000 may be detected. The processor 1001 performs left and right hand recognition or a quick operation according to the holding signal acquired by the pressure sensor 1013. When the pressure sensor 1013 is disposed on the low layer of the display screen 1005, the processor 1001 controls, according to a pressure operation of the user on the display screen 1005, an operable control on the UI. The operable control includes at least one of a button control, a scroll-bar control, an icon control, and a menu control.

The fingerprint sensor 1014 is configured to acquire a user's fingerprint, and the processor 1001 identifies a user's identity according to the fingerprint acquired by the fingerprint sensor 1014, or the fingerprint sensor 1014 identifies a user's identity according to the acquired fingerprint. When the identity of the user is identified as a trusted identity, the processor 1001 authorizes the user to perform a related sensitive operation. The sensitive operation includes unlocking a screen, viewing encrypted information, downloading software, payment, changing settings, and the like. The fingerprint sensor 1014 may be disposed on a front surface, a back surface, or a side surface of the terminal 1000. When a physical button or a vendor logo is disposed on the terminal 1000, the fingerprint sensor 1014 may be integrated with the physical button or the vendor logo.

The optical sensor 1015 is configured to acquire ambient light intensity. In an embodiment, the processor 1001 may control display luminance of the display screen 1005 according to the ambient light intensity collected by the optical sensor 1015. Specifically, when the ambient light intensity is relatively high, the display luminance of the display screen 1005 is increased. When the ambient light intensity is relatively low, the display luminance of the display screen 1005 is reduced. In another embodiment, the processor 1001 may further dynamically adjust a camera parameter of the camera assembly 1006 according to the ambient light intensity acquired by the optical sensor 1015.

The proximity sensor 1016, also referred to as a distance sensor, is usually disposed on a front panel of the terminal 1000. The proximity sensor 1016 is configured to collect a distance between a user and the front surface of the terminal 1000. In an embodiment, when the proximity sensor 1016 detects that the distance between the user and the front surface of the terminal 1000 gradually becomes smaller, the display screen 1005 is controlled by the processor 1001 to switch from a screen-on state to a screen-off state. In accordance with a determination that the proximity sensor 1016 detects that the distance between the user and the front surface of the terminal 1000 gradually becomes larger, the display screen 1005 is controlled by the processor 1001 to switch from the screen-off state to the screen-on state.

A person skilled in the art may understand that the structure shown in FIG. 10 does not constitute a limitation to the terminal 1000, and the terminal may include more or fewer components than those shown in the figure, or some components may be combined, or a different component deployment may be used.

The embodiments of this application further provide a computer-readable storage medium, storing at least one computer program, the at least one computer program being loaded and executed by a processor of a terminal to implement the operations performed by the terminal in the information display method according to the foregoing embodiments. For example, the computer-readable storage medium may be a read-only memory (ROM), a random access memory (random-access memory, RAM), a compact disc read-only memory (CD-ROM), a magnetic tape, a floppy disk, an optical data storage device, and the like.

The embodiments of this application further provide a computer program product, including computer program code, the computer program code being stored in a computer-readable storage medium. A processor of a terminal reads the computer program code from the computer-readable storage medium, and the processor executes the computer program code, to cause the terminal to perform the information display method provided in the foregoing various embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely embodiments of this application, but are not intended to limit this application. Any modification, equivalent replacement, or improvement made within the spirit and principle of this application shall fall within the protection scope of this application.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs an information display method. In practical application, the foregoing functions may be allocated to and completed by different functional modules according to requirements, that is, an inner structure of a device is divided into different functional modules to implement all or a part of the functions described above.

What is claimed is:

1. An information display method, performed by an electronic device, the method comprising:
   displaying, on the electronic device of a user account, a first display region and a second display region of a target battle, the first display region configured to display a plurality of to-be-banned first-type virtual objects, the second display region configured to display at least one second-type virtual object associated with at least one friendly account, wherein the friendly account is an account from a same camp as the user account in the target battle, and displaying at least one third-type virtual object preselected by the friendly account in the target battle in the second display region;
   receiving information associated with a selection of a target virtual object from the plurality of first-type virtual objects; and
   in accordance with a determination that the target virtual object matches the at least one second-type virtual object:
      displaying first prompt information associated with the target virtual object in the first display region, wherein the first prompt information indicates a presence of a friendly account associated with the target virtual object; and
      concurrently displaying second prompt information associated with the target virtual object in the second display region, wherein the second prompt information indicates a corresponding position of the target virtual object in the second display region;
in accordance with a determination that the target virtual object matches the at least one third-type virtual object:
displaying third prompt information based on the target virtual object in the first display region, wherein the third prompt information indicates that a friendly account has preselected the target virtual object, and
in accordance with a determination that a display duration of the third prompt information exceeds a first duration: ceasing to display the third prompt information.

2. The method according to claim 1, further comprising:
in accordance with a determination that the target virtual object matches the at least one second-type virtual object:
displaying the first prompt information in a first floating window at a corresponding position of the target virtual object in the first display region, and
displaying the second prompt information using a special effect at the corresponding position of the target virtual object in the second display region.

3. The method according to claim 2, wherein the second prompt information is displayed in a second floating window.

4. The method according to claim 1, further comprising:
in accordance with a determination that the target virtual object matches the at least one second-type virtual object:
displaying the first prompt information using a special effect at a corresponding position of the target virtual object in the first display region; and
displaying the second prompt information in a second floating window at the corresponding position of the target virtual object in the second display region.

5. The method according to claim 1, further comprising:
in accordance with a determination that the target virtual object matches the at least one second-type virtual object:
displaying the first prompt information using a special effect at a corresponding position of the target virtual object in the first display region; and
displaying the second prompt information using a special effect at the corresponding position of the target virtual object in the second display region.

6. The method according to claim 1, further comprising:
in accordance with a determination that the target virtual object matches the at least one third-type virtual object:
displaying fourth prompt information based on the target virtual object in the second display region, wherein the fourth prompt information indicates the corresponding position of the target virtual object in the second display region.

7. The method according to claim 6, further comprising:
in accordance with a determination that the target virtual object matches the at least one third-type virtual object:
displaying the third prompt information in a third floating window at a corresponding position of the target virtual object in the first display region; and
displaying the fourth prompt information using a special effect at the corresponding position of the target virtual object in the second display region.

8. The method according to claim 6, further comprising:
in accordance with a determination that the target virtual object matches the at least one third-type virtual object:
displaying the third prompt information in a third floating window at a corresponding position of the target virtual object in the first display region; and
displaying the fourth prompt information in a fourth floating window at the corresponding position of the target virtual object in the second display region.

9. The method according to claim 6, further comprising:
in accordance with a determination that the target virtual object matches the at least one third-type virtual object:
displaying the third prompt information using a special effect at a corresponding position of the target virtual object in the first display region; and
displaying the fourth prompt information in a fourth floating window at the corresponding position of the target virtual object in the second display region.

10. The method according to claim 6, further comprising:
in accordance with a determination that the target virtual object matches the at least one third-type virtual object:
displaying the third prompt information using a special effect at a corresponding position of the target virtual object in the first display region; and
displaying the fourth prompt information using a special effect at the corresponding position of the target virtual object in the second display region.

11. The method according to claim 6, further comprising:
in accordance with a determination that a display duration of the fourth prompt information exceeds a second duration:
ceasing to display the fourth prompt information;
in accordance with a determination that a display duration of the first prompt information exceeds a third duration:
ceasing to display the first prompt information; and
in accordance with a determination that a display duration of the second prompt information exceeds a fourth duration:
ceasing to display the second prompt information.

12. The method according to claim 6, further comprising:
in accordance with a determination that the target virtual object matches the at least one third-type virtual object:
playing a first prompt sound effect indicating that the target virtual object matches the at least one third-type virtual object.

13. The method according to claim 1, wherein the plurality of first-type virtual objects and the at least one second-type virtual object are displayed in an avatar form or a card form.

14. The method according to claim 1, further comprising:
obtaining at least one friendly account in the target battle; and
obtaining at least one virtual object associated with the at least one friendly account as the at least one second-type virtual object.

15. The method according to claim 14, further comprising:
determining a virtual object associated with one of the at least one friendly account according to virtual objects used by the friendly account in a plurality of historical battles, wherein the historical battle is a battle played prior to the target battle.

16. The method according to claim 1, further comprising:
in accordance with a determination that the target virtual object matches the at least one second-type virtual object:
playing a second prompt sound effect to indicate that the target virtual object matches the at least one second-type virtual object.

17. An electronic device, comprising:
one or more processors; and
memory storing one or more programs, the one or more programs comprising instructions that, when executed by the one or more processors, cause the one or more processors to perform operations comprising:

displaying, on the electronic device of a user account, a first display region and a second display region of a target battle, the first display region configured to display a plurality of to-be-banned first-type virtual objects, the second display region configured to display at least one second-type virtual object associated with at least one friendly account, wherein the friendly account is an account from a same camp as the user account in the target battle, and displaying at least one third-type virtual object preselected by the friendly account in the target battle in the second display region;

receiving information associated with a selection of a target virtual object from the plurality of first-type virtual objects; and in accordance with a determination that the target virtual object matches the at least one second-type virtual object:

displaying first prompt information associated with the target virtual object in the first display region, wherein the first prompt information indicates a presence of a friendly account associated with the target virtual object; and concurrently displaying second prompt information associated with the target virtual object in the second display region, wherein the second prompt information indicates a corresponding position of the target virtual object in the second display region;

in accordance with a determination that the target virtual object matches the at least one third-type virtual object:

displaying third prompt information based on the target virtual object in the first display region, wherein the third prompt information indicates that a friendly account has preselected the target virtual object, and in accordance with a determination that a display duration of the third prompt information exceeds a first duration: ceasing to display the third prompt information.

18. The electronic device according to claim 17, further comprising:

in accordance with a determination that the target virtual object matches the at least one second-type virtual object:

displaying the first prompt information in a first floating window at a corresponding position of the target virtual object in the first display region and displaying the second prompt information using a special effect at the corresponding position of the target virtual object in the second display region.

19. The electronic device according to claim 17, further comprising:

in accordance with a determination that the target virtual object matches the at least one third-type virtual object:

displaying fourth prompt information based on the target virtual object in the second display region, wherein the fourth prompt information indicates the corresponding position of the target virtual object in the second display region.

20. A non-transitory computer-readable storage medium, storing a computer program, the computer program, when executed by one or more processors of an electronic device, cause the one or more processors to perform operations comprising:

displaying, on the electronic device of a user account, a first display region and a second display region of a target battle, the first display region configured to display a plurality of to-be-banned first-type virtual objects, the second display region configured to display at least one second-type virtual object associated with at least one friendly account, wherein the friendly account is an account from a same camp as the user account in the target battle, and displaying at least one third-type virtual object preselected by the friendly account in the target battle in the second display region;

receiving information associated with a selection of a target virtual object from the plurality of first-type virtual objects; and in accordance with a determination that the target virtual object matches the at least one second-type virtual object:

displaying first prompt information associated with the target virtual object in the first display region, wherein the first prompt information indicates a presence of a friendly account associated with the target virtual object; and concurrently displaying second prompt information associated with the target virtual object in the second display region, wherein the second prompt information indicates a corresponding position of the target virtual object in the second display region;

in accordance with a determination that the target virtual object matches the at least one third-type virtual object:

displaying third prompt information based on the target virtual object in the first display region, wherein the third prompt information indicates that a friendly account has preselected the target virtual object, and in accordance with a determination that a display duration of the third prompt information exceeds a first duration: ceasing to display the third prompt information.

\* \* \* \* \*